US011535447B2

(12) United States Patent
Ford et al.

(10) Patent No.: US 11,535,447 B2
(45) Date of Patent: Dec. 27, 2022

(54) MOBILE AND CASCADABLE STORAGE SILO

(71) Applicant: WESTCAP AG CORP., Grande Prairie (CA)

(72) Inventors: Darrell Ford, Spruce Grove (CA); Lonny Thiessen, Hythe (CA)

(*) Notice: Subject to any disclaimer, the term of this patent is extended or adjusted under 35 U.S.C. 154(b) by 387 days.

(21) Appl. No.: 16/339,581

(22) PCT Filed: Nov. 2, 2017

(86) PCT No.: PCT/CA2017/051305
§ 371 (c)(1),
(2) Date: Apr. 4, 2019

(87) PCT Pub. No.: WO2018/081902
PCT Pub. Date: May 11, 2018

(65) Prior Publication Data
US 2021/0276793 A1 Sep. 9, 2021

Related U.S. Application Data

(60) Provisional application No. 62/417,160, filed on Nov. 3, 2016, provisional application No. 62/485,541, filed
(Continued)

(51) Int. Cl.
*B65D 88/54* (2006.01)
*B65D 88/12* (2006.01)
(Continued)

(52) U.S. Cl.
CPC .......... *B65D 88/544* (2013.01); *B65D 88/12* (2013.01); *B65D 88/30* (2013.01); *B65D 88/32* (2013.01);
(Continued)

(58) Field of Classification Search
CPC ...... B65D 88/544; B65D 88/12; B65D 88/14; B65D 88/30; B65D 88/32; B65D 88/1631;
(Continued)

(56) References Cited

U.S. PATENT DOCUMENTS 5,868,234 A * 2/1999 Morimoto .............. B65G 69/16
193/12
8,651,792 B2 2/2014 Friesen
(Continued)

FOREIGN PATENT DOCUMENTS

DE 29511913 9/1995
EP 2865615 4/2015

*Primary Examiner* — Glenn F Myers
(74) *Attorney, Agent, or Firm* — Ryan W. Dupuis; Kyle R. Satterthwaite; Ade & Company Inc.

(57) ABSTRACT

A storage silo for storing granular material has a container supported by a base, the container having a roof and at least one side wall for defining a storage space beneath the roof. The storage silo includes: (a) a feed port for receiving the granular material at a feed-port height lower than the roof; (b) an auger for moving the granular material toward the roof within the storage space, the auger receiving the granular material via the feed port; and (c) first and second auger motors for cooperatively driving the auger, the first and second auger motors being disposed at opposing ends of the auger. A processor determines power levels for the first and second auger motors to minimize torsional strain on the auger. Granular material can be discharged from a first storage silo into a second storage silo positioned for cascading with the first storage silo.

31 Claims, 22 Drawing Sheets

Related U.S. Application Data on Apr. 14, 2017, provisional application No. 62/513,901, filed on Jun. 1, 2017.

(51) Int. Cl.

| | | |
|---|---|---|
| *B65D 88/30* | (2006.01) | |
| *B65D 88/32* | (2006.01) | |
| *B65G 65/32* | (2006.01) | |
| *B65G 65/46* | (2006.01) | |
| *E04H 7/22* | (2006.01) | |

(52) U.S. Cl.
CPC ........... *B65G 65/32* (2013.01); *B65G 65/463* (2013.01); *E04H 7/22* (2013.01); *B65D 2588/12* (2013.01); *B65D 2588/54* (2013.01)

(58) Field of Classification Search
CPC .. B65D 88/52; B65D 88/005; B65D 2588/12; B65D 2588/54; B65G 65/463; B65G 65/466; E04H 7/22; A01F 25/14; A01F 25/163; A01F 25/183; A01F 25/186; A01F 25/20; A01F 25/2009; A01F 25/2018; A01F 12/60
USPC ................ 414/298, 310, 317, 319, 326, 323
See application file for complete search history.

(56) References Cited

U.S. PATENT DOCUMENTS

| | | | |
|---|---|---|---|
| 9,017,001 | B1* | 4/2015 | Dueck .................. B65G 65/32 414/302 |
| 2004/0423351 | | 3/2004 | Cecala et al. |
| 2013/0149081 | A1 | 6/2013 | Noyes |
| 2016/0251152 | A1* | 9/2016 | Krupa .................. B65D 88/005 206/386 |

* cited by examiner

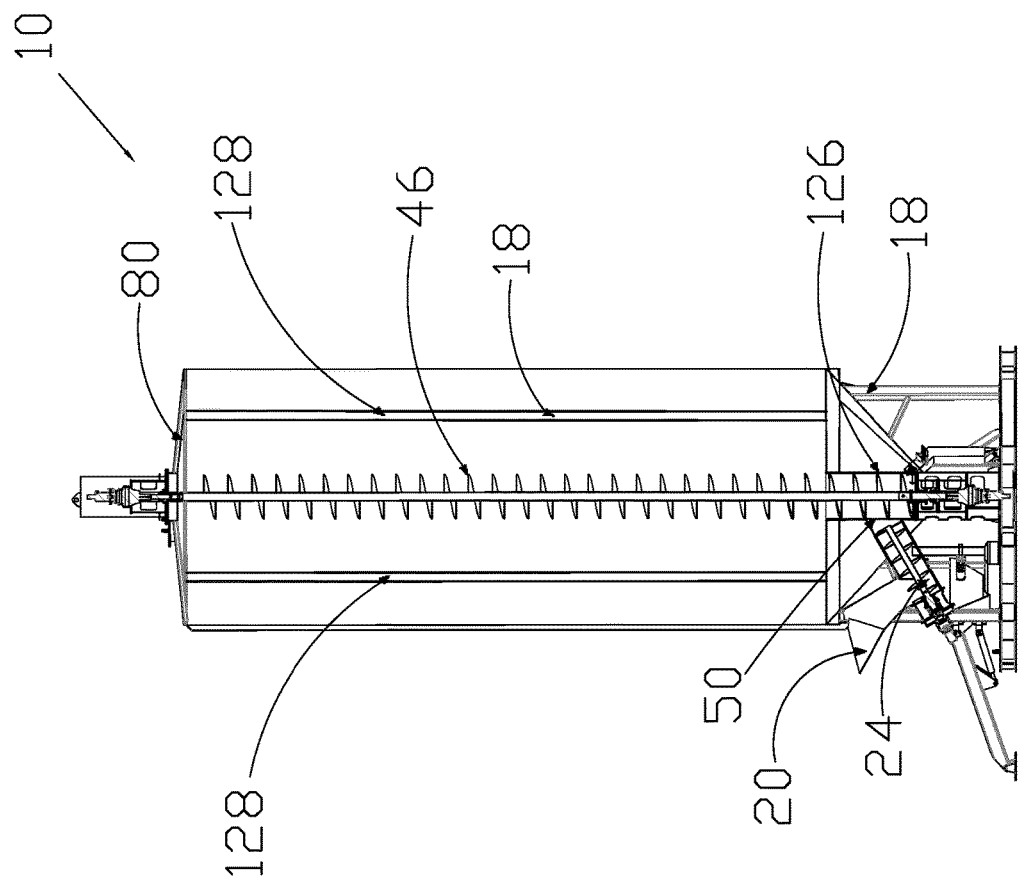

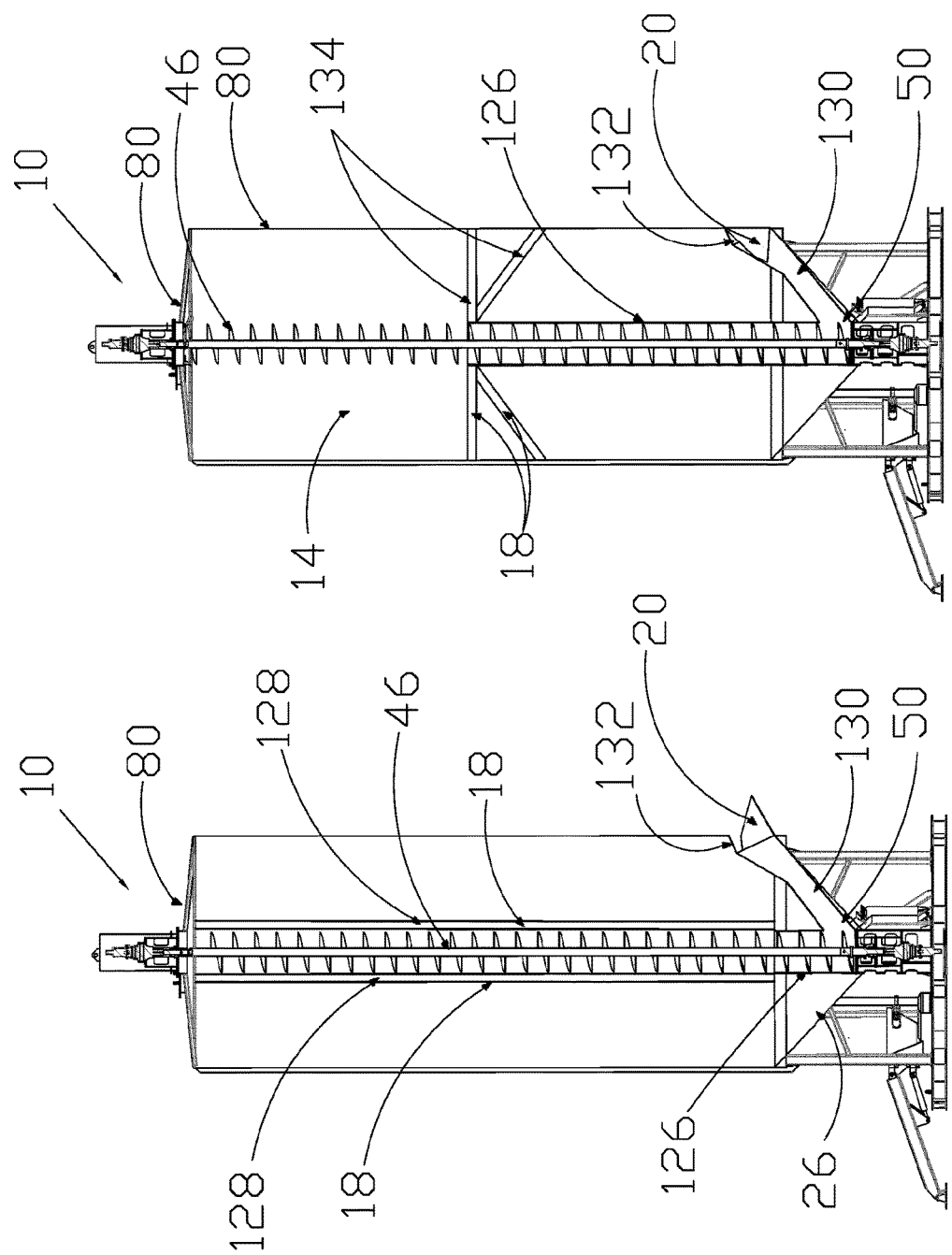

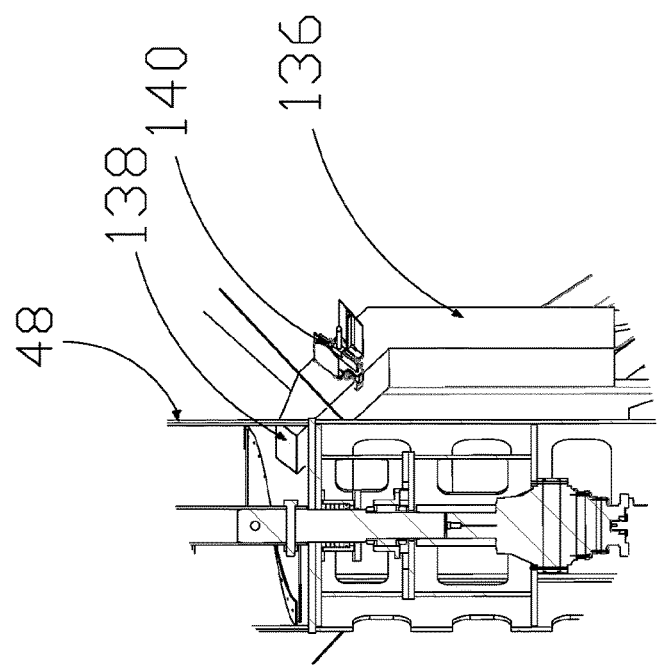
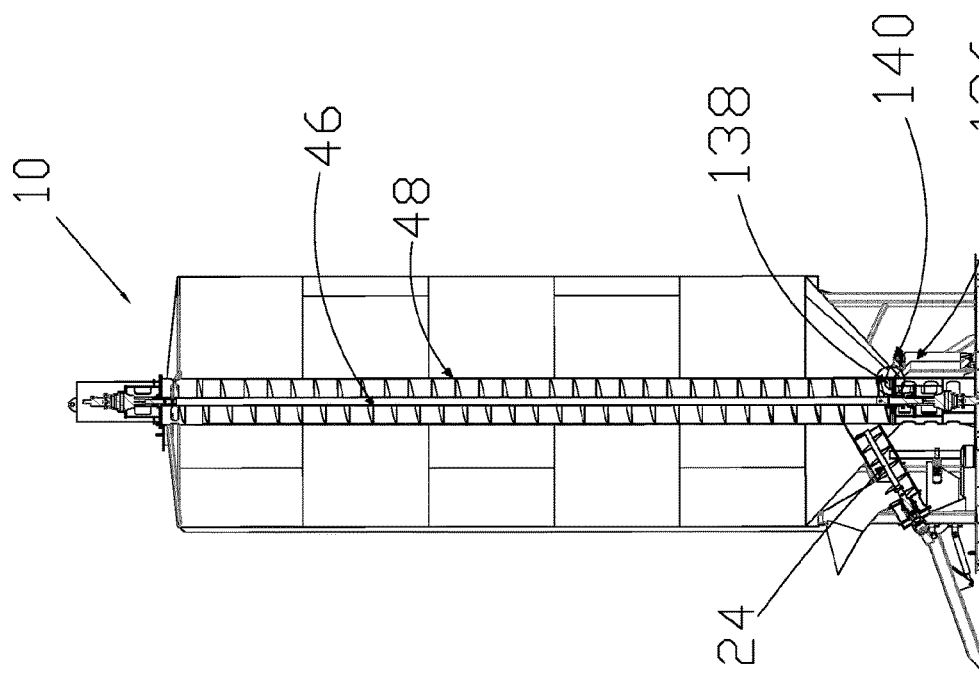

MOBILE AND CASCADABLE STORAGE SILO

BACKGROUND OF THE INVENTION

1. Field of Invention

This invention relates to material handling and, in particular, to a mobile and cascadable storage silo suitable for storing and delivering granular material.

2. Description of Related Art

Granular material, such as sand, proppant, grain, and the like, is used in bulk quantities in several applications. For example, in hydraulic fracture drilling by oil and gas companies, fracturing fluid comprising a granular proppant material, such as sand and/or ceramics, is pumped into a drill well to create and prop open fractures in rock. Often, activities requiring large amounts of granular material are performed in a remote location, requiring granular material to be shipped to the site and stored in large quantities in a manner that makes the material reliably available in sufficient quantities as required for the particular application. Therefore, there is a need for improved mobile storage systems for storing and delivering large quantities of granular material at remote site operations, or other applications requiring temporary granular material storage.

SUMMARY

The above shortcomings may be addressed by providing, in accordance with one aspect of the invention, a storage silo. The storage silo is a mobile and cascadable storage silo. The silo may be configurable into a deployed configuration. The silo may be configurable into a transport configuration. The silo may be dimensioned for transport when it is in its transport configuration.

The silo may include a container for storing the granular material. The silo may include a base for supporting the container. The base may be dimensioned for transport. The base may be a skid. The base may be rectangular. The base may be in the shape of a square.

The container may be supported by the base. The container may be supported on top of the base. The container may be supported on the top side of the base. The container may include a bottom cone. The bottom cone may have a frusto-conical shape. The container may include a roof. The container may include a side wall extending between the bottom cone and the roof. The side wall may form a cylindrical shape. The container may include a plurality of side walls. The base may support the bottom cone. The base may support the side wall.

The silo may include a conveyor. The conveyor may be operable to convey granular material from one side of the base to a different side of the base. The conveyor may be operable to convey granular material across the base from one side of the base to the opposite side of the base. The conveyor may be supported by the base. The conveyor may be attached to the top of the base. The silo may include a receive port for receiving granular material. The receive port may be operable to receive granular material into the conveyor. The conveyor may include the receive port. The receive port may include a conveyor hopper. The conveyor hopper may be disposed at the one side of the base. The conveyor hopper may be distal from the top of the base by a first distance. The conveyor hopper may be pivotably attached to the remainder of the conveyor. The conveyor hopper may be pivotable between an operating position associated with the deployed configuration of the silo and a retracted position associated with the transport configuration of the silo.

The conveyor may include a discharge port. The discharge port may be operable to discharge granular material being conveyed by the conveyor. The receive port and the discharge port may be disposed at different sides of the base. The receive port and the discharge port may be disposed at opposing sides of the base. The conveyor hopper and the discharge port may be on different sides of the base. The conveyor hopper and the discharge port may be on opposing sides of the base. The conveyor may extend longitudinally between the conveyor hopper and the discharge port. The conveyor may longitudinally extend off-center from the center point of the base. The discharge port may be distal from the top of the base by a second distance. The second distance may be greater than the first distance. The second distance may be greater than the first distance such that granular material discharged from the discharge port of a first silo enters a second conveyor hopper of a second silo adjacently aligned with the first silo. First and second silos may be adjacently aligned so as to permit the granular material being discharged from the first silo at its discharge port to be received by the second silo at its conveyor hopper. First and second silos may be cascaded so as to permit the granular material being discharged from the first silo at its discharge port to be received by the second silo at its conveyor hopper. A plurality of cascaded silos may define a final discharge port of a terminal silo of the plurality of cascaded silos. The plurality of cascaded silos may be operable to discharge granular material exiting from any one or more selected silos of the plurality of cascaded silos. The plurality of cascaded silos may be operable to discharge the granular material at the final discharge port.

The conveyor may include a conveyor belt. The conveyor may include first and second drums for moving the conveyor belt. The conveyor may include a third drum disposed at the vertex of an angled pathway of the conveyor belt. The conveyor belt may travel substantially parallel to the base between the first and third drums. The conveyor may include an inclined portion between the second and third drums. The conveyor may include a cover for substantially enclosing the conveyor belt. The silo may include an exit duct extending between the container and the conveyor. The exit duct may intersect the conveyor between the receive port and the discharge port. The exit duct may intersect the conveyor between the conveyor hopper and the discharge port. The exit duct may intersect the conveyor between the conveyor hopper and the vertex. The exit duct may intersect the conveyor at an aperture in the conveyor. The exit duct may intersect the conveyor at an aperture in the cover. The exit duct may intersect the container at the bottom cone. The exit duct may intersect the container at an aperture in the bottom cone. The exit duct may be operable to permit granular material to exit the container and be received by the conveyor. The exit duct may include an exit valve. The silo may include an exit-duct actuator for actuating the exit valve.

The silo may be operable to blend first granular material received by the conveyor hopper and second granular material exiting the exit duct to produce blended granular material at the discharge port. The plurality of cascaded silos may be operable to blend respective granular material exiting selected silos of the plurality of cascaded silos to produce blended granular material at the final discharge port.

The silo may include an auger support. The auger support may include a mast. The mast may extend between the base and the roof. The auger support may include a collar. The collar may project from the base and not extend to the roof. The auger support may have a hollow cylindrical shape. The auger support may be attached to the base at the center of the base. The mast may be attached to the roof at the center of the roof. The auger support may be operable to act as a structural member of the silo. The auger support may be operable to provide structural stability to the silo. The silo may include a frame. The frame may be attached to the base. The frame may include the auger support. The auger support may form part of the frame. The silo may define a storage space to the interior of the side wall, above the bottom cone and below the roof. The silo may define a main storage portion of the storage space, the main storage portion being exterior to the auger support.

The silo may include a main auger. The main auger may be housed within the mast. The mast may be dimensioned to house the main auger. The mast may act as a housing for the main auger. The mast may include upper apertures proximate the roof. The upper apertures may be disposed within the storage space. The upper apertures may be dimensioned to permit granular material to move from an upper end of the main auger into the main storage portion of the storage space. The main auger along a portion of its length may be supported by the auger support. The main auger along a portion of its length may be supported by the collar. The collar may be dimensioned to house a longitudinal portion of the main auger. The collar may be open at its top.

The silo may include a lower motor disposed at a lower end of the main auger. The lower motor may be disposed within the auger support. The lower motor may be disposed proximate to the base. The auger support may include lower apertures proximate the lower motor. The lower motor may be disposed between the base and the bottom cone. The lower motor may be operable to rotationally drive the main auger.

The silo may include an upper motor disposed at the upper end of the main auger. The upper motor may be disposed proximate to the roof. The upper motor may be disposed on an outer side of the roof opposite the storage space. The upper motor may be operable to rotationally drive the main auger. The lower and upper motors may be operable to cooperatively drive the main auger.

The auger support may include an inner liner. The inner liner may extend along the inside surface of the auger support. The inner liner may be made of a low-friction material. The inner liner may be made of an UHMW (ultra-high molecular weight) material. The UHMW material may be an UHMW thermoplastic. The thermoplastic may be polyethylene. The inner liner may be made of UHMW polyethylene. The silo may be operable to prevent continuous rotation of the inner liner. The auger support may be dimensioned to prevent continuous rotation of the inner liner. The auger support may include a positioning ridge. The positioning ridge may project inwardly from an inner surface of the auger support. The positioning ridge may extend longitudinally along the inner surface of the auger support. The inner liner may be curved to form a longitudinal gap between opposing longitudinal edges of the inner liner. The positioning ridge may be dimensioned to abut either longitudinal edge of the inner liner. The inner liner may be dimensioned such that the longitudinal gap is larger than the transverse width of the positioning ridge. The inner liner may be attached to the auger support at its inside surface by fastening. The inner liner may be bolted to the auger support. The inner liner may be replaceable.

The main auger may have a helical shape. The main auger may define flights extending between a central longitudinal axis of the main auger and an outer edge of the main auger. The main auger may define a helical outer edge. The main auger may include an edging for lining at least the helical outer edge. The edging may be made of the UHMW material. The edging may be made of the UHMW thermoplastic. The edging may be made of UHMW polyethylene. The edging may be attached to the helical outer edge by fastening. The edging may be bolted to the helical outer edge. The edging may be replaceable. Contact between the main auger and the auger support may occur only between the edging and the inner liner. The silo may be operable to permit expansion and contraction of the edging in a helical direction. The edging may include a plurality of edging sections. Each edging section may include an edging slot. Each edging slot may be dimensioned for alignment with an associated auger aperture. At least one of the edging slot and the associated auger aperture may be elongated in a helical direction.

The silo may include a feed auger. The feed auger may be operable to move granular material toward the main auger at the lower end of the main auger. The silo may include a feed-auger housing. The feed-auger housing may be dimensioned to house the feed auger. The silo may include a feed motor for rotationally driving the feed auger. The feed-auger housing may extend between the bottom cone and the feed motor. The feed-auger housing may project from the bottom cone so as to be cantilevered.

The silo may include a feed port. The feed port may include a feed hopper. The feed hopper may be attached to the feed-auger housing. The feed hopper may be attached to the feed-auger housing at a feed aperture of the feed-auger housing. The silo may be operable to receive granular material into the silo via the feed hopper. The feed hopper may be pivotably attached to the feed-auger housing. The feed hopper may be pivotable between an operating position associated with the deployed configuration of the silo and a retracted position associated with the transport configuration of the silo.

The feed-auger housing may include a feed liner. The feed liner may extend along the inside surface of the feed-auger housing. The feed liner may be made of the UHMW material. The feed liner may be made of the UHMW thermoplastic. The feed liner may be made of the UHMW polyethylene. The silo may be operable to prevent continuous rotation of the feed liner. The feed-auger housing may be dimensioned to prevent continuous rotation of the feed liner. The feed-auger housing may include a feed-liner positioning ridge. The feed-liner positioning ridge may project inwardly from an inner surface of the feed-auger housing. The feed-liner positioning ridge may extend longitudinally along the inner surface of the feed-auger housing. The feed liner may be curved to form a longitudinal gap between opposing longitudinal edges of the feed liner. The feed-liner positioning ridge may be dimensioned to abut either longitudinal edge of the feed liner. The feed liner may be dimensioned such that the longitudinal gap is larger than the transverse width of the feed-liner positioning ridge. The feed liner may be attached to the feed-auger housing by fastening. The feed liner may be bolted to the feed-auger housing. The feed liner may be replaceable.

The feed auger may have a helical shape. The feed auger may define flights extending between a central longitudinal axis of the feed auger and an outer edge of the feed auger.

The feed auger may define a helical outer edge. The feed auger may include a feed edging for lining at least the helical outer edge of the feed auger. The feed edging may be made of the UHMW material. The feed edging may be made of the UHMW thermoplastic. The feed edging may be made of the UHMW polyethylene. The feed edging may be attached to the helical outer edge of the feed auger by fastening. The feed edging may be bolted to the helical outer edge of the feed auger. The feed edging may be replaceable. Contact between the feed auger and the feed-auger housing may occur only between the feed edging and the feed liner. The silo may be operable to permit expansion and contraction of the feed edging in a helical direction. The feed edging may include a plurality of feed-edging sections. Each feed-edging section may include a feed-edging slot. Each feed-edging slot may be dimensioned for alignment with an associated feed-auger aperture. At least one of the feed-edging slot and the associated feed-auger aperture may be elongated in a helical direction.

The feed auger may extend longitudinally between first and second ends of the feed auger. The feed auger may be rotationally driven by the feed motor at the first end. The feed auger may be unattached at the second end. The feed auger at its second end may be coupled to the main auger via an inlet aperture in the auger support.

The silo may include one or more outriggers. The outriggers may be pivotably attached to the frame of the silo. The outriggers may be hingedly attached to the frame of the silo. The outriggers may be pivotably and hingedly attached to the frame of the silo. Each outrigger may be pivotable between an operating position associated with the deployed configuration of the silo and a retracted position associated with the transport configuration of the silo. The outriggers may be hingedly attached to the frame of the silo by load pins. The silo may be operable to determine the extent of loading on the load pins. The silo may be operable to determine a measure of stability of the silo in its deployed configuration in response to the extent of loading on the load pins of the silo.

The silo may include a feed duct operable to empty the feed-auger housing of granular material. The feed duct may include a dump duct. The dump duct may extend between the feed-auger housing and the conveyor. The feed auger may be reversible. The feed motor may be reversible. The main auger may be reversible. The lower and upper motors may each be reversible. The dump duct may be dimensioned to permit granular material disposed in the feed-auger housing to exit the feed-auger housing and enter the conveyor. The dump duct may be dimensioned to permit granular material disposed in the auger support to exit the auger support and enter the conveyor via the feed-auger housing. The dump duct may include a dump valve. The silo may include a dump-duct actuator for actuating the dump valve.

The silo may include a processor for performing digital computations and a memory for storing digital data. A plurality of silos may include a processor for performing digital computations and a memory for storing digital data. The processor may be operable to receive user input. The memory may contain program code for directing operations of the processor. The memory may include data received by the processor from sensors of the silo. The processor may be operable to determine, in response to user input and sensor data, an indication of stability of the silo. The processor may be operable to determine, in response to user input and sensor data, power levels to be applied to the lower and upper motors so as to minimize torsional strain on the main auger. The processor may be operable to determine, in response to user input and sensor data, respective valve positions of a plurality of exit valves of a plurality of cascaded silos so as to discharge blended granular material at the final discharge port of the plurality of cascaded silos.

The foregoing summary is illustrative only and is not intended to be in any way limiting. Other aspects and features of the present invention will become apparent to those of ordinary skill in the art upon review of the following description of embodiments of the invention in conjunction with the accompanying figures and claims.

BRIEF DESCRIPTION OF THE DRAWINGS

In drawings which illustrate by way of example only embodiments of the invention:

FIG. 20 is a sectional view of a mobile and cascadable storage silo according to a second embodiment of the invention, showing a collar supporting the main auger;

FIG. 21 is a sectional view of a mobile and cascadable storage silo according to a third embodiment of the invention, showing a passive chute in its operating position;

FIG. 22 is a sectional view of a variation of the silo shown in FIG. 21, showing the passive chute in its retracted position;

FIG. 23 is a sectional cut-out view of a mobile and cascadable storage silo according to a fourth embodiment of the invention, showing an auger duct; and FIG. 24 is a close-up view of a portion of the silo shown in FIG. 23, showing an auger-duct actuator.

DETAILED DESCRIPTION

An apparatus for storing granular material includes: (a) container means for containing the granular material; (b) support means for supporting the container means on top of the support means, the support means being dimensioned for transport; (c) conveying means for conveying the granular material, the conveying means being supported by the support means, the conveying means comprising: (i) hopper means for receiving additional granular material on a first side of the support means, the hopper means being distal from the top of the support means by a first distance, and (ii) discharge means for discharging the additional granular material on a second side of the support means opposite the first side, the discharge means being distal from the top of the support means by a second distance greater than the first distance so as to permit the additional granular material to be discharged from the discharge means into a second hopper means of a second apparatus adjacently aligned with the apparatus; and (d) exit-duct means for permitting granular material to exit the container means and be received by the conveying means for blending with the additional granular material prior to being discharged from the discharge means.

Figure 1:
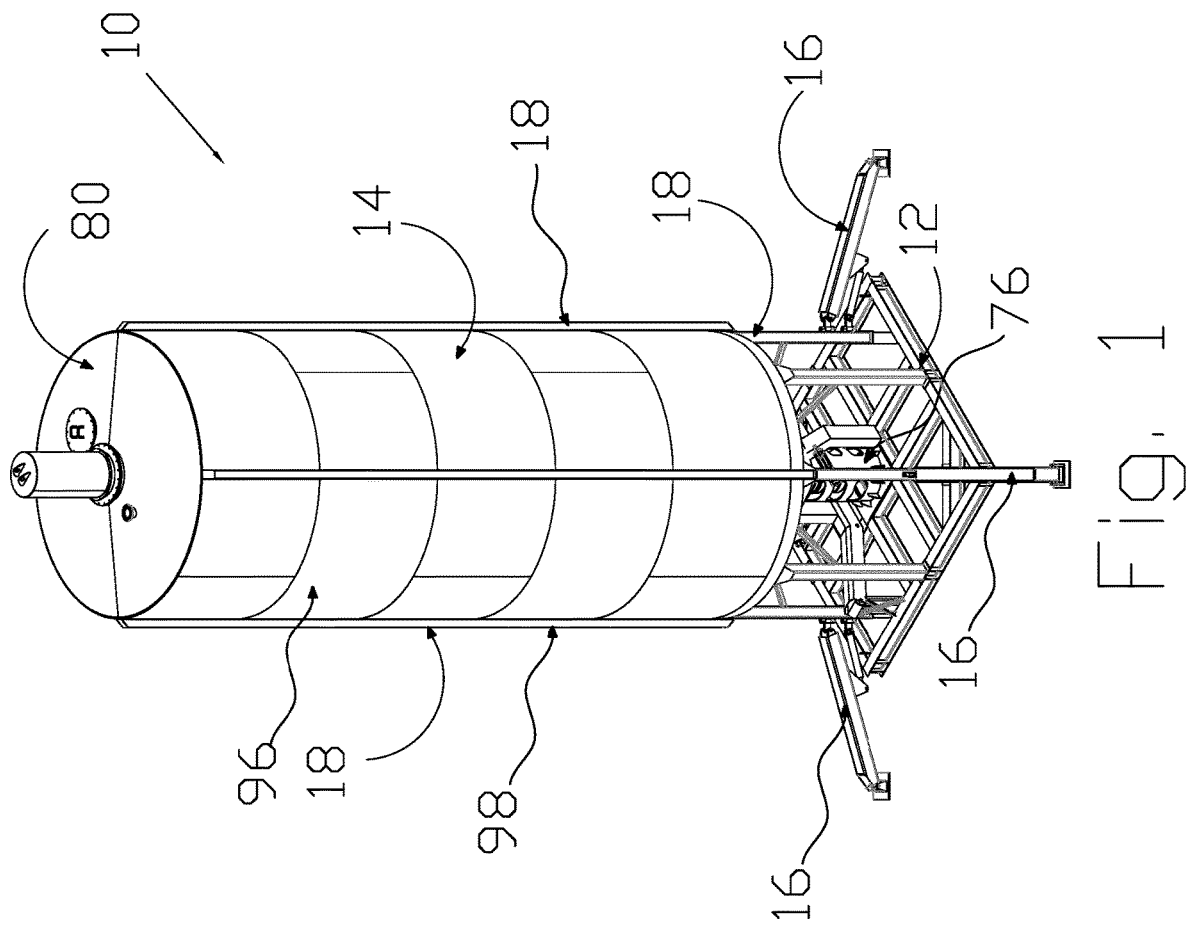
FIG. 1 is a perspective view of a mobile and cascadable storage silo according to a first embodiment of the invention, showing the silo in its deployed configuration.
Figure 2:
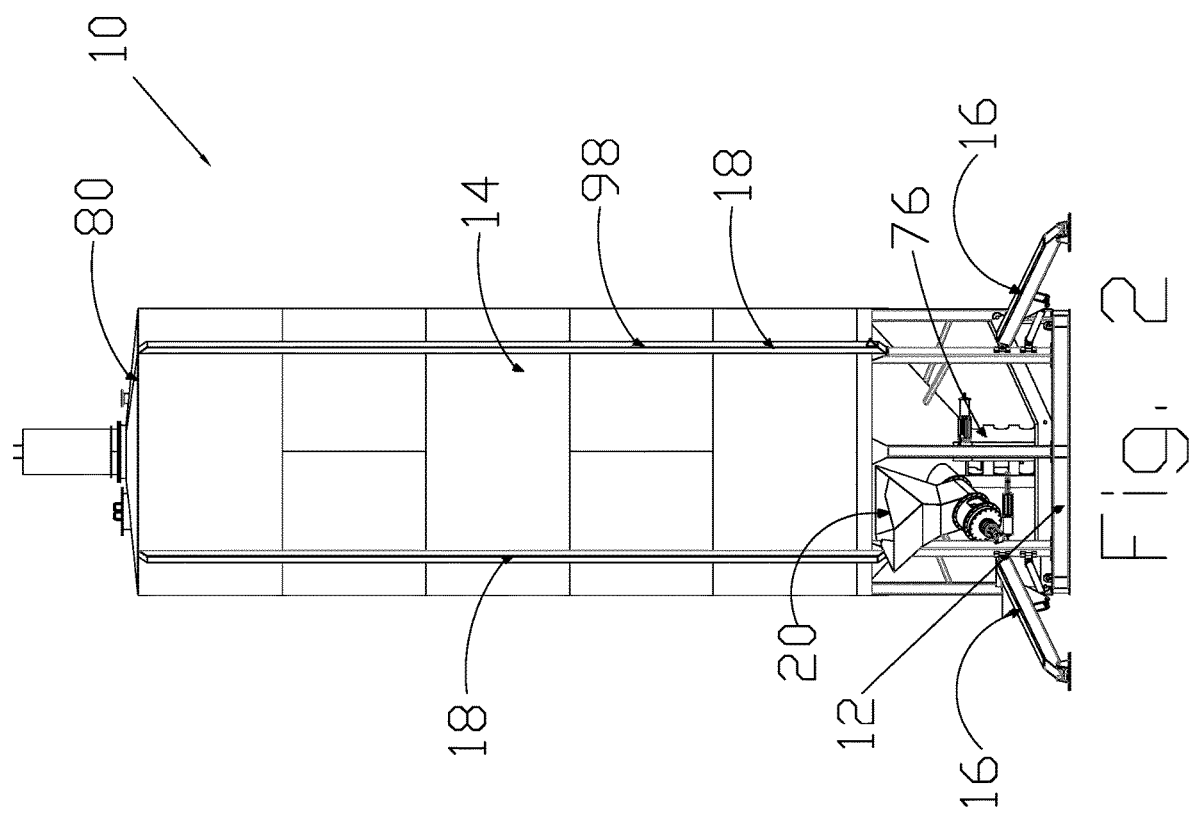
FIG. 2 is a side view of the silo shown in FIG. 1, showing container atop a skid.

Referring to FIGS. 1 and 2, the apparatus according to a first embodiment of the invention is shown generally at 10. The apparatus 10 functions as a silo 10 for storing granular material such as sand. The silo 10 includes a base, such as the skid 12 shown in FIG. 1, which supports the container 14 atop the base. In the first embodiment, outriggers 16 are pivotably attached to a frame 18, which in turn is attached to the skid 12. The outriggers 16 advantageously enhance the stability of the silo 10 during use in the deployed configuration shown in FIGS. 1 and 2. In various embodiments for varying applications, any number of the outriggers 16 may have any suitable length(s) or may be omitted entirely.

In general, the skid 12 may have any suitable shape and any suitable size. In the first embodiment, the skid 12 preferably has a squared or rectangular shape with dimensions suitable for transport.

Figure 3:
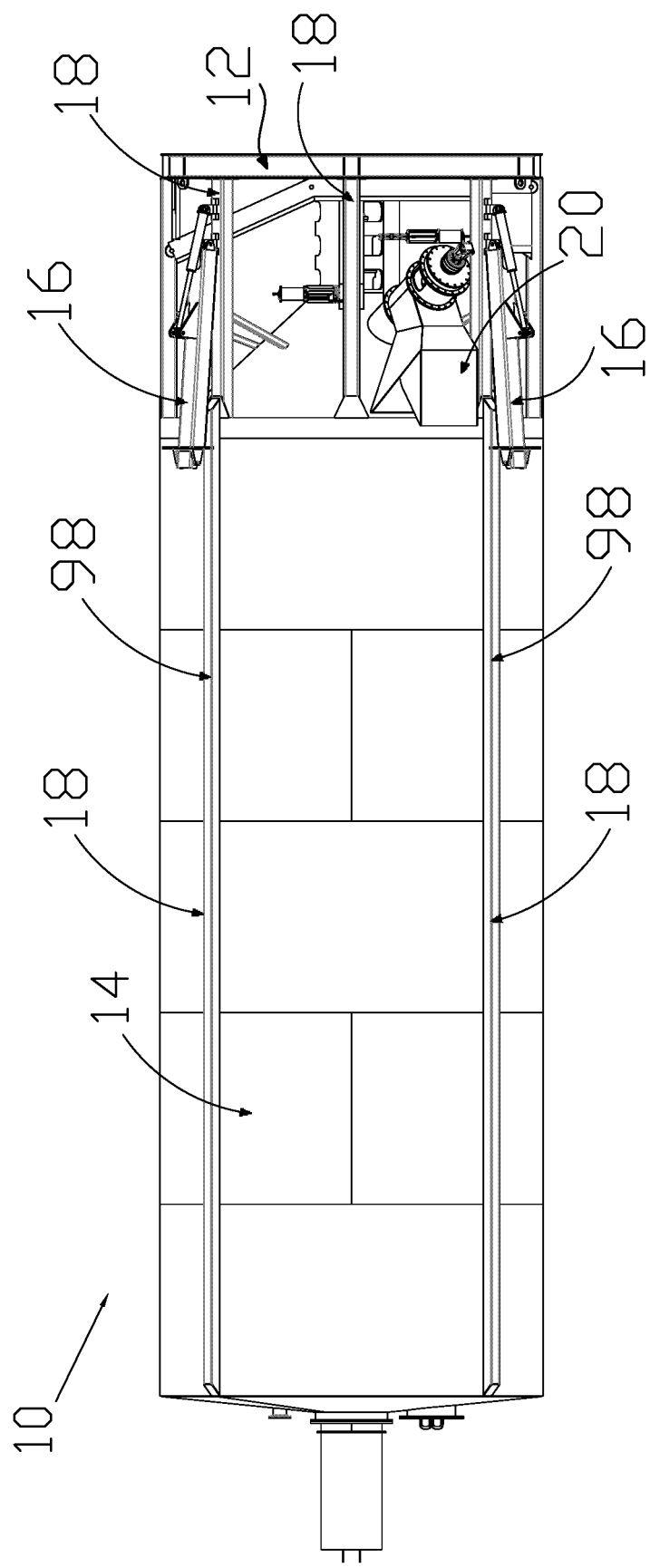
FIG. 3 is a side view of the silo shown in FIG. 1, showing the silo in its transport configuration.

Referring to FIG. 3, the silo 10 is mobile and can be transported in a transport configuration. In the first embodiment, various components of the silo 10 are pivotably attached to the skid 12, the frame 18, or both the skid 12 and the frame 18, such that the length and width of the entire silo 10 is equal to or less than the length and width of the skid 12, while the height of the silo 10 is unchanged between the transport configuration shown in FIG. 3 and the deployed configuration shown in FIGS. 1 and 2. Typically, the length and width of the base and the height of the silo 10 are selected accordingly to regulated dimensions for transport by semi-trailer truck (not shown in FIG. 3) or other flatbed transport vehicle (not shown in FIG. 3), and may vary according to changes in transport regulations and/or jurisdiction. The transport vehicle may include a low-profile trailer (not shown in FIG. 3), for example. In at least one instance of the first embodiment, each of the length and width of the skid 12 is sixteen (16) feet (4.88 m). The silo 10 may have a height that is commensurate with the useable length of a standard or customized trailer.

Referring to FIGS. 2 to 5, the silo 10 includes a feed port, such as the feed hopper 20, for receiving granular material from an external source (not shown). In the first embodiment, the feed hopper 20 is pivotably attached to a feed conduit, such as the feed-auger housing 22 shown in FIG. 5 for example. In the deployed configuration, the feed hopper 20 projects outwardly and upwardly from the feed-auger housing 22 such that the received material drops into the feed-auger housing 22, via the feed hopper 20, where a feed auger 24 is housed within the feed-auger housing 22. In the embodiment shown in FIG. 5, the feed-auger housing 22 projects downwardly and outwardly from the portion of the container 14 forming a bottom cone 26 toward a feed drive end 28 of the feed-auger housing 22. The feed-auger housing 22 may project at any suitable angle to the horizontal plane of skid 12, such as a 25 degree angle or any angle within the range of 22 to 28 degrees or 0 to 90 degrees angled downwardly or upwardly, for example.

At the feed drive end 28 is a feed-auger motor 30 for driving the feed auger 24. In variations of embodiments, any number of feed-auger housings 22 containing respective feed augers 24 may be employed. A plurality of feed-auger housings 22 may project from the container 14 at different heights above the skid 12, at different positions around the container 14, or any combination thereof for example.

In the first embodiment, the feed-auger motor 30 is a hydraulic motor that is powered by an externally supplied hydraulic line (not shown). However, in general, any type of motor or engine, including an electric motor, pneumatic motor, mechanical power system, internal or external combustion engine or other source of motive power, may be employed.

Figure 6:
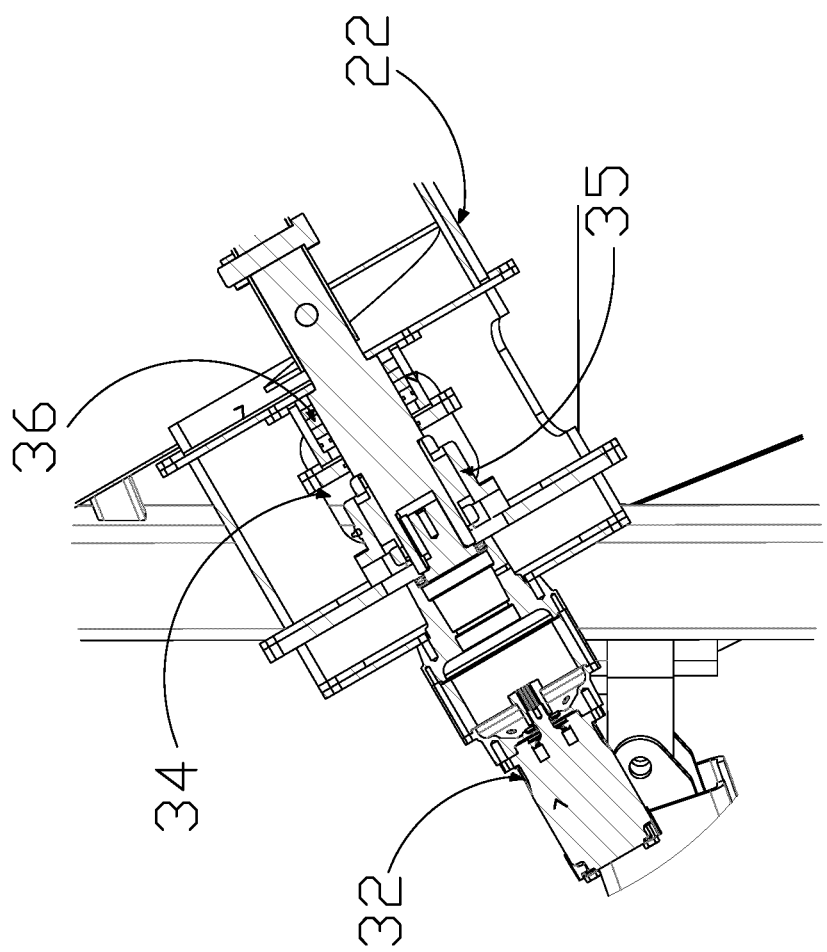
FIG. 6 is a sectional view of a portion of the silo shown in FIGS. 1 and 5, showing a feed-auger motor.

Referring to FIG. 6, the feed-auger motor 30 includes a hydraulic attachment point 32 for receiving the externally supplied hydraulic line (not shown), a feed-motor gearbox 34 for producing a desired speed of rotation of the feed auger 24, and a bearing 35 for rotatably attaching the feed-auger motor 30 to the feed-auger housing 22. In the first embodiment, the feed-auger motor 30 is removably attached to the feed-auger housing 22, with a seal, such as the packing gland 36 shown in FIG. 6, being disposed between the feed-auger motor 30 and the feed-auger housing 22 to prevent entry of the granular material into the feed-auger motor 30.

Figure 7:
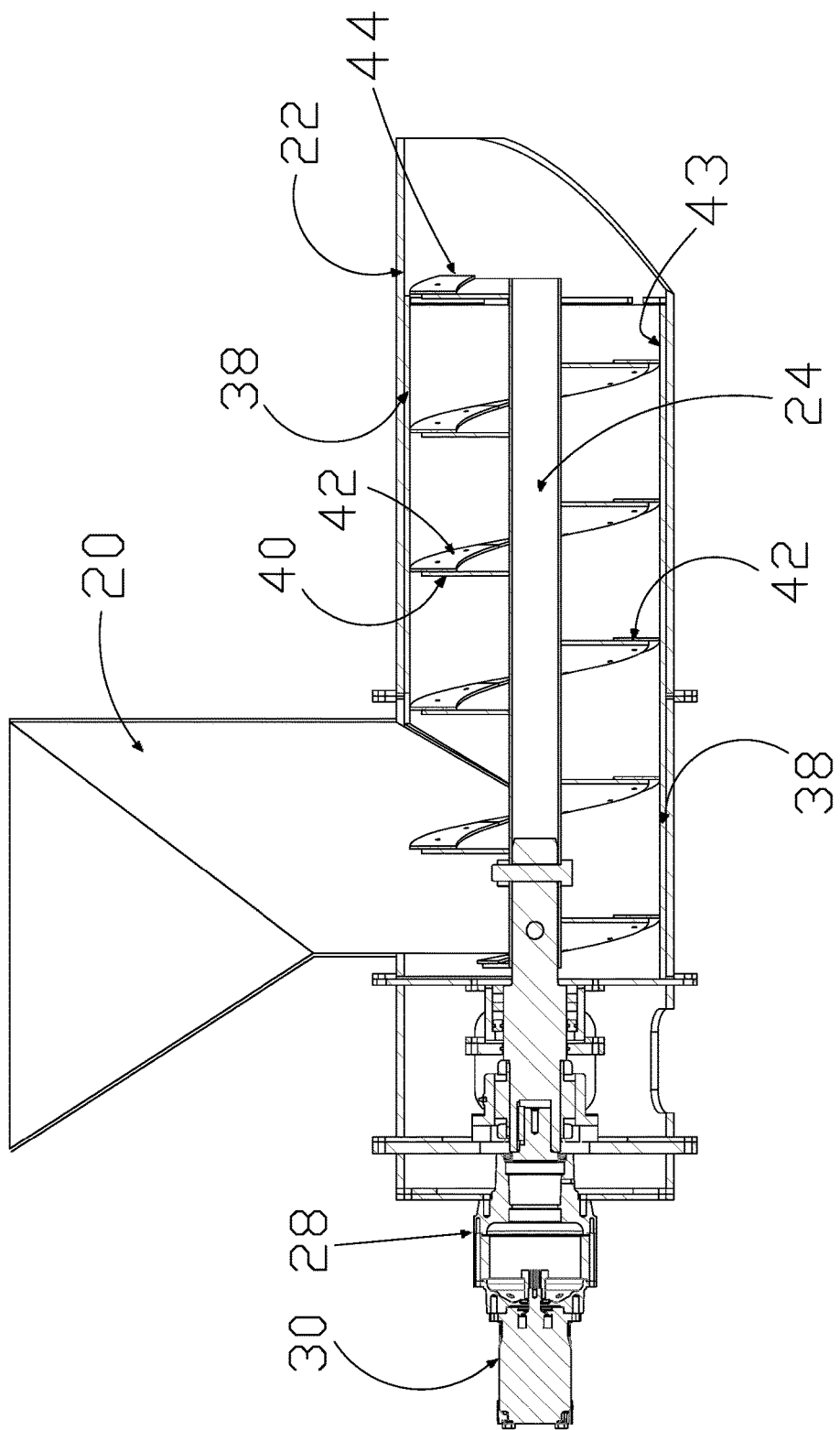
FIG. 7 is a sectional view of a portion of the silo shown in FIGS. 1 and 5, showing a feed edging of the feed auger proximate to a feed liner of the feed-auger housing.

Referring to FIGS. 6 and 7, the feed auger 24 in the first embodiment is engaged by the feed-auger motor 30 at the feed drive end 28 and is aligned along its length within the feed-auger housing 22. The feed-auger housing 22 includes a feed liner 38 disposed along the inside surface of the feed-auger housing 22. The feed liner 38 is typically made of a material that exhibits low friction, such as UHMW (ultra-high molecular weight) polyethylene or other thermoplastic or polymeric material, for example, and may be made of a combination or mixture of materials for example. The feed liner 38 may be installed into the feed-auger housing 22 in any suitable manner, such as by placing, jam-fitting, fastening, adhering, plastic welding, spray forming or other techniques for example. In some embodiments, the feed liner 38 is bolted to the inside surface of the feed-auger housing 22.

Typically, the feed auger 24 has a helical shape defining a helical outer edge 40 of the feed auger 24. In the first embodiment, a feed edging 42 made of a low-friction material is applied to the feed auger 24 along at least a portion of its helical outer edge 40. The low-friction material of the feed edging 42 may be UHMW polyethylene or any other suitable material, for example. The feed edging 42 may be applied to the feed auger 24 in any suitable manner, such as by fastening, adhering, jam-fitting, plastic welding, spray forming or other techniques for example. In the first embodiment as shown in FIG. 7, the feed edging 42 is applied to the feed auger 24 by bolting or otherwise fastening the feed edging 42 to the feed auger 24.

The application of the feed liner 38 and the feed edging 42 advantageously facilitates restricting contact between the feed-auger housing 22 and the helical outer edge 40 of the feed auger 24 to potential contact occurring between low-friction materials only. In particular, in the first embodiment contact occurs between the feed liner 38 and the feed edging 42 whenever a sealing gap 43 between the feed liner 38 and the feed edging 42 is closed, such as being momentarily closed during rotation of the feed auger 24. In the first embodiment, the sealing gap 43 size is approximately 0.04 inches (1 mm) and preferably no more than 0.4 inches (10 mm). However, the size of the sealing gap 43 can be suitably varied for different sizes and types of granular material.

In the first embodiment, either or both of the feed liner 38 and the feed edging 42 are replaceable so as to advantageously reduce wear and enhance longevity of the feed-auger housing 22 and the feed auger 24. The feed liner 38 and the feed edging 42 may have any suitable thicknesses, which may be the same or different from each other and may be in a range between 0.25 inches (6.4 mm) and 1 inch (25.4 mm) for example.

Referring back to FIG. 5, the feed auger 24 in the first embodiment is unattached at its coupling end 44 and unrestrained by any load bearing component, thereby advantageously permitting the feed auger 24 to deliver the granular material proximate to the bottom center of the main auger 46 uninhibited by any bearing. Preferably, a coupling gap 47 is maintained between the outer paths defined by the main auger 46 and the feed auger 24 to prevent collision between the main auger 46 and the feed auger 24. In the first embodiment, the coupling gap 47 is typically at least one-half inch for ease of manufacturing and typically less than six inches to avoid unnecessary plugging of granular material within the coupling gap. In general, however, any coupling gap 47 distance may be suitably employed, provided excessive plugging of granular material is avoided.

The feed auger 24 and feed-auger housing 22 may have any suitable cross-sectional diameter, including having a cross-sectional diameter in the range of 12 inches (30 cm) to 36 inches (91 cm). The feed-auger housing 22 in the first embodiment has a cross-sectional diameter of 24 inches (60 cm), for example. In some embodiments, the feed edging 42 acts as a support bearing at the unattached coupling end 44 of the feed auger 24. In some embodiments, the feed edging 42 is applied to the helical outer edge 40 near the coupling end 44 only. In the first embodiment, however, the feed edging 42 is applied along the entire length of the helical outer edge 40.

Figure 5:
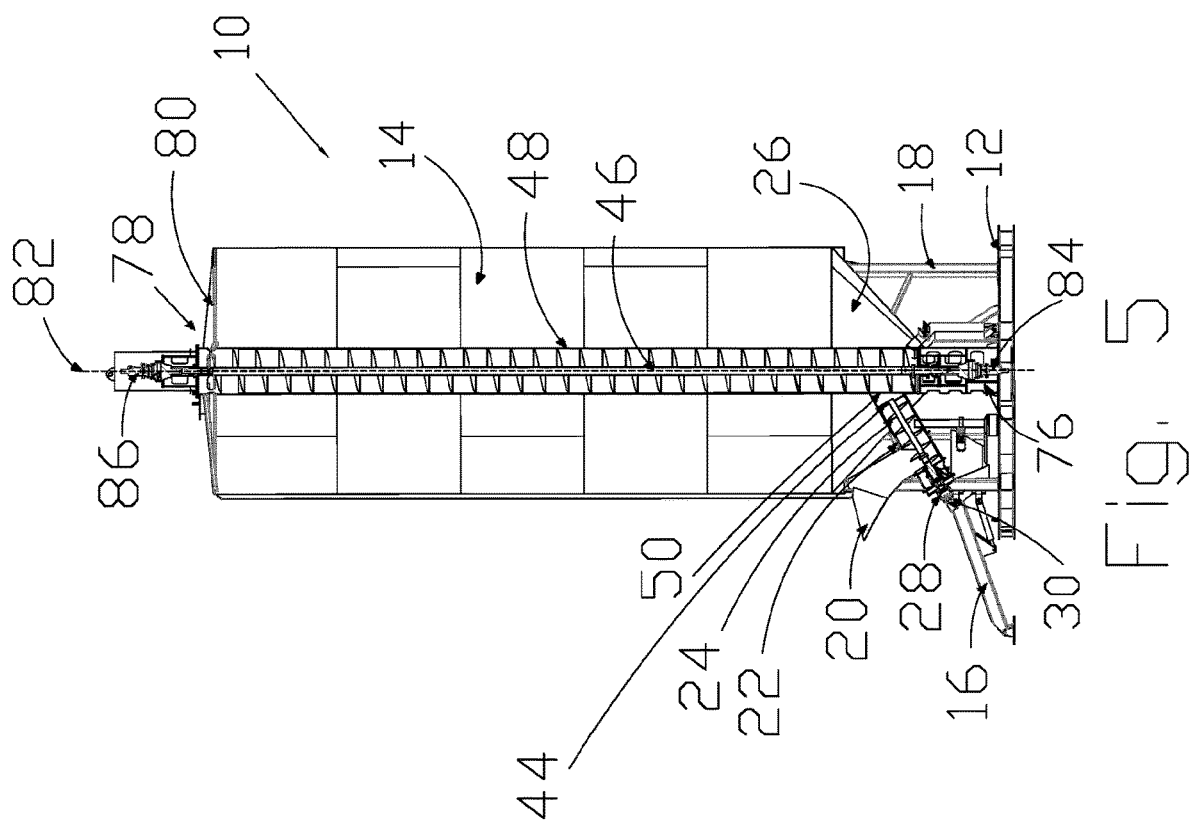
FIG. 5 is a sectional view along lines A-A of FIG. 4, showing a feed auger in a feed-auger housing.

The main auger 46 shown by sectional view in FIG. 5 is housed within a main-auger support such as the mast 48. Granular material that is received into the feed-auger housing 22 via the feed hopper 20 is delivered by the feed auger 24 to the main auger 46 via an inlet aperture 50 in the mast 48.

Figure 8:
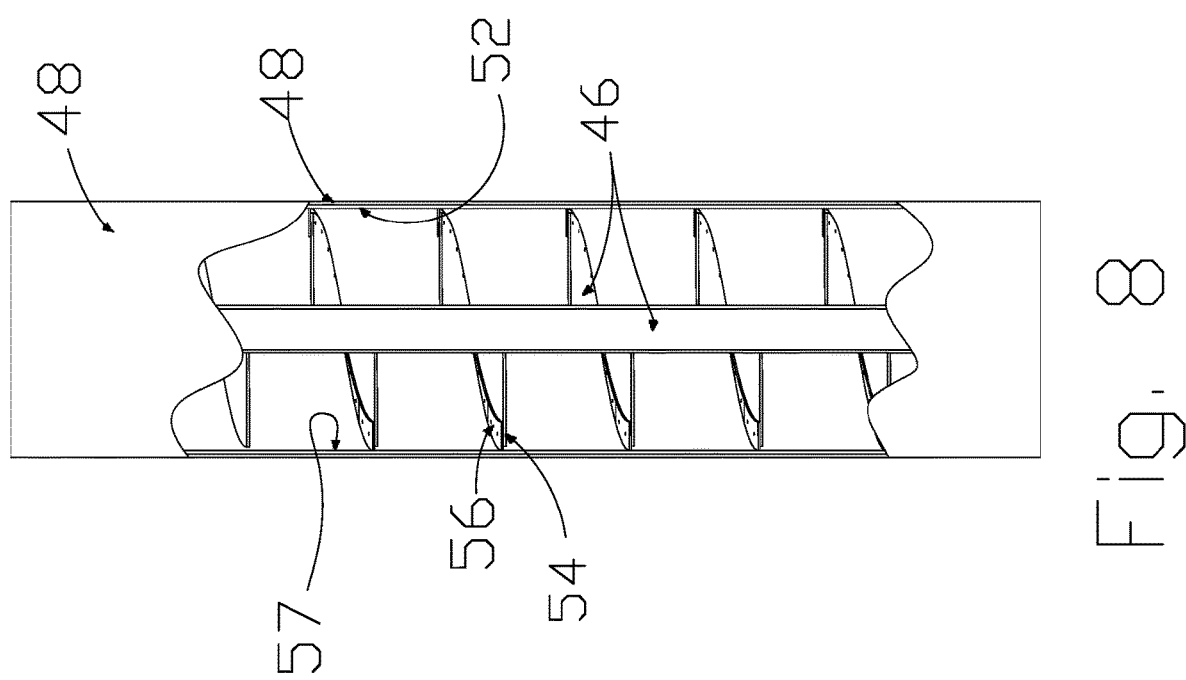
FIG. 8 is a sectional view of a cutout portion of a mast of the silo shown in FIGS. 1 and 5, showing an edging of the main auger proximate to a liner of the mast.

Referring to FIG. 8, the mast 48 includes a low-friction liner 52 disposed along the inside surface of the mast 48. The liner 52 may be made of UHMW polyethylene or other suitable low-friction material, for example, and may be applied to the inside surface of the mast 48 in any suitable manner, such as by placing, jam-fitting, fastening, adhering, plastic welding, spray forming or other techniques for example. In some embodiments, the liner 52 is bolted to the inside surface of the mast 48.

Typically, the main auger 46 has a helical shape defining a helical outer edge 54 of the main auger 46. In the first embodiment, an edging 56 made of a low-friction material is applied to the main auger 46 along at least a portion of its helical outer edge 54. The low-friction material of the edging 56 may be UHMW polyethylene or any other suitable material, for example. The edging 56 may be applied to the main auger 46 in any suitable manner, such as by fastening, adhering, jam-fitting, plastic welding, spray forming or other techniques for example. In the first embodiment as shown in FIG. 8, the edging 56 is applied to the main auger 46 by bolting or otherwise fastening the edging 56 to the main auger 46.

The application of the liner 52 and the edging 56 advantageously facilitates restricting contact between the mast 48 and the helical outer edge 54 of the main auger 46 to contact occurring between low-friction materials only. In particular, in the first embodiment, contact occurs between the liner 52 and the edging 56 whenever a sealing gap 57 between the feed liner 38 and the feed edging 42 is closed, such as being momentarily closed during rotation of the main auger 46. In the first embodiment, the sealing gap 57 size is approximately 0.04 inches (1 mm) and preferably no more than 0.4 inches (10 mm). However, the size of the sealing gap 57 can be suitably varied for different sizes and types of granular material.

In the first embodiment, either or both of the liner 52 and the edging 56 are replaceable so as to advantageously reduce wear and enhance longevity of the mast 48 and the main auger 46. The feed liner 38 and the feed edging 42 may have any suitable thicknesses, which may be the same or different from each other and may be in a range between 0.25 inches (6.4 mm) and 1 inch (25.4 mm) for example.

Figure 9:
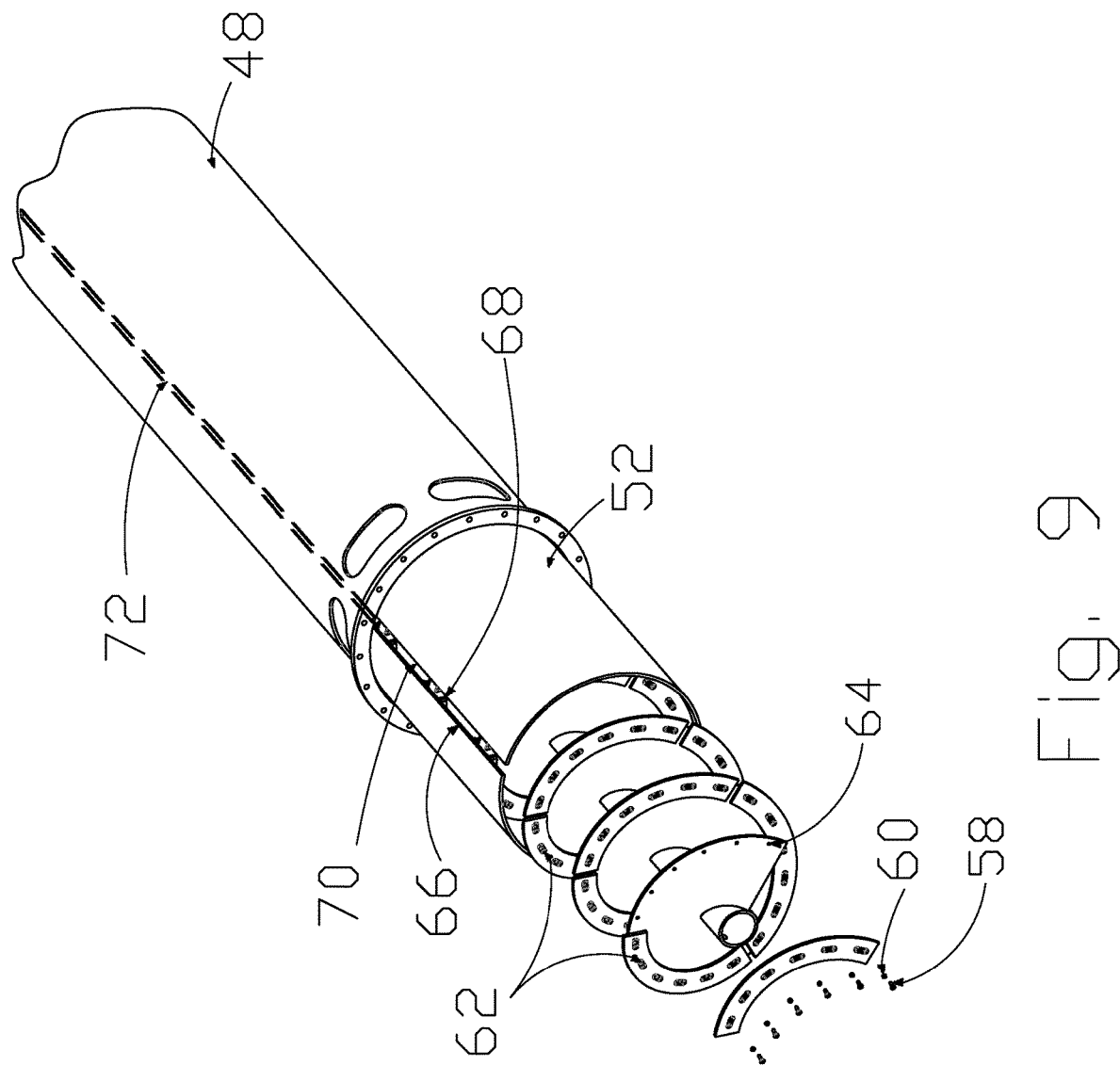
FIG. 9 is a perspective view of an unassembled portion of the silo shown in FIGS. 1 and 5, showing fasteners for fastening the edging and showing a longitudinal gap of the liner.

Referring to FIG. 9, in the first embodiment the edging 56 sections are fastened to the main auger 46 by bolts 58 and nuts 60 which are installed on opposing sides of the edging 56 and the main auger 46 through edging slots 62 and auger apertures 64. In the first embodiment, each edging slot 62 is elongated in the helical direction defined by each edging 56 section, and the edging 56 sections are spaced apart from each other when fastened to the main auger 46 along its helical outer edge 40. In this manner, the edging 56 sections are advantageously permitted to contract and expand, such as due to temperature changes, in the helical direction. Expansion of the edging 56 sections is constrained in the outward radial direction by closure of the sealing gap 57. Thus, use of the elongated edging slots 62 to permit helical expansion advantageously avoids excessive friction between the inner liner 52 and the edging 56 that would result from closure of the sealing gap 57, such as by radial expansion, warping, or other deformation of the edging 56.

Additionally or alternatively to the edging slots 62 being elongated, the auger apertures 64 may be elongated in the helical direction to facilitate helical contraction and expansion of the edging 56 sections.

While FIG. 9 shows details for permitting contraction and expansion of the edging 56 sections fastened to the main auger 46, similar or analogous fastening and positioning of the feed edging 42 (FIGS. 5 and 7) along the helical outer edge 40 of the feed auger 24 may be advantageously employed.

Figure 10:
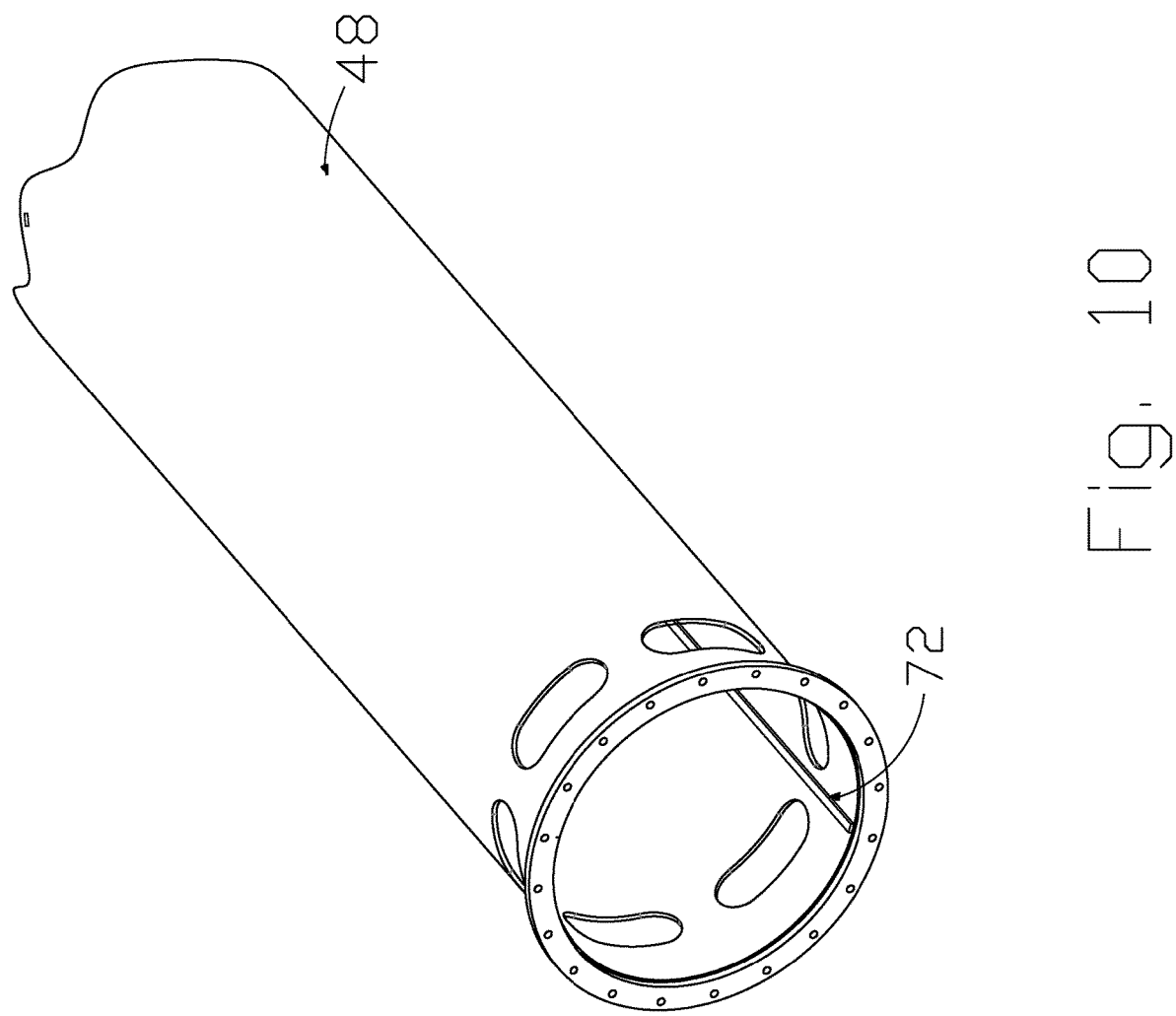
FIG. 10 is a perspective view of the portion of the mast shown in FIG. 9, showing a positioning ridge of the mast.

Referring to FIGS. 9 and 10, the liner 52 in the first embodiment includes first and second longitudinal edges 66 and 68 extending along the entire length of the liner 52. A longitudinal gap 70 is defined between the first and second longitudinal edges 66 and 68. A positioning ridge 72 (shown by dotted lines in FIG. 9) projects inwardly from the inner surface of the mast 48 and extends longitudinally. Preferably, the liner 52 is installed within the mast 48 to align the longitudinal gap 70 with the positioning ridge 72 such that the first and second longitudinal edges 66 and 68 are disposed on either side of the positioning ridge 72. The positioning ridge 72 advantageously prevents continuous rotation of the liner 52 within the mast 48 when either the first or second longitudinal edge 66 or 68 abuts against the positioning ridge 72. Simultaneously, the positioning ridge 72 is dimensioned to permit the liner 52 to contract and expand, such as due to temperature changes, within the confines of the longitudinal gap 70. In the first embodiment, the positioning ridge 72 has a transverse width that is less than that of the gap 70, to advantageously permit expansion of the liner 52. Also in the first embodiment, the positioning ridge 72 projects a distance less than the thickness of the liner 52, thereby advantageously preventing collisions between the positioning ridge 72 and the main auger 46 or its edging 56. In general, the positioning ridge 72 may be made of any suitable material. In the first embodiment, the positioning ridge 72 is made of the same material as the mast 48. In variations, the positioning ridge 72 need not extend the entire length of the mast 48. Also, a plurality of collinear positioning ridges 72 may be employed for example.

While FIGS. 9 and 10 shows details for preventing continuous rotation of the inner liner 52, similar or analogous preventative measures for the feed liner 38 (FIG. 7) within the feed-auger housing 22 may be advantageously employed.

Figure 11:
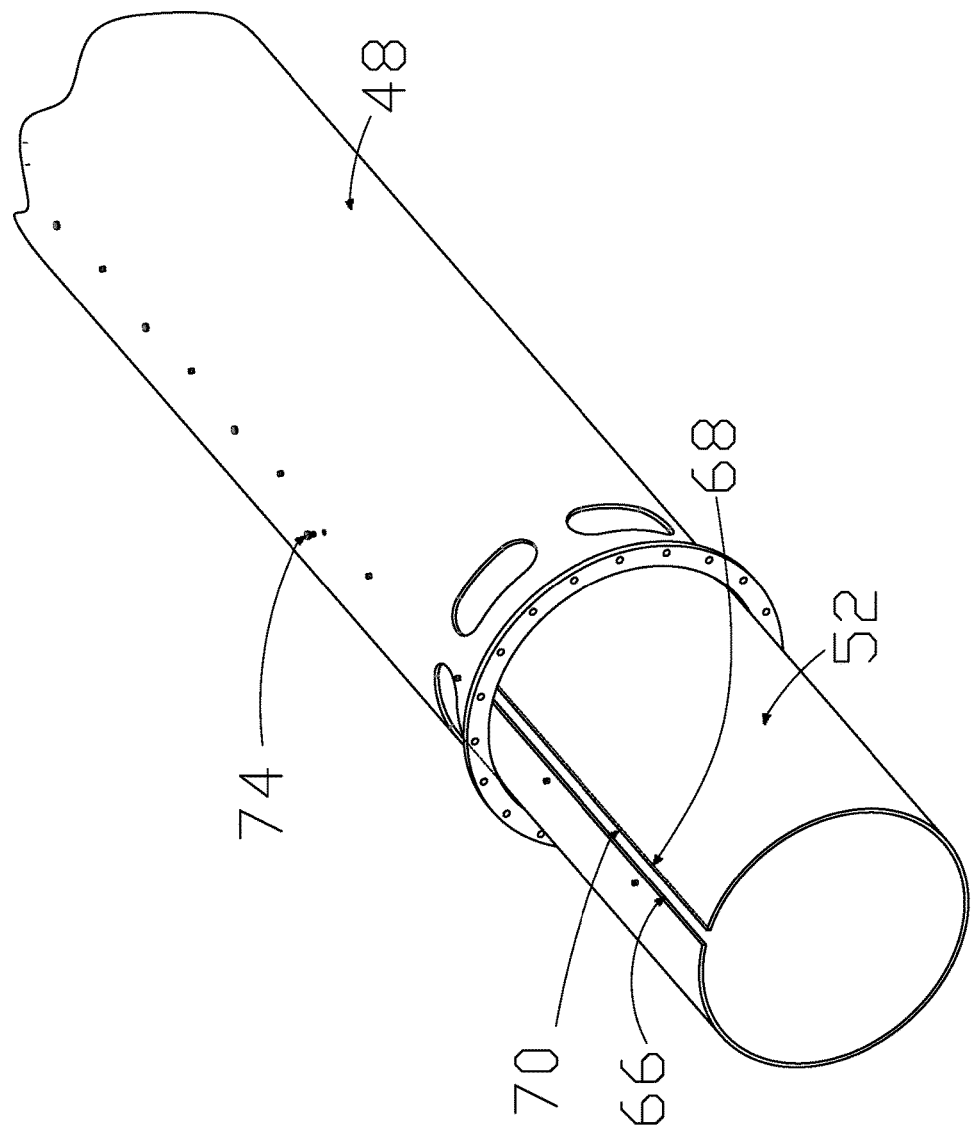
FIG. 11 is a perspective view of a variation of the unassembled portion shown in FIG. 9, showing fasteners for fastening the liner.

Referring to FIG. 11, a variation of the first embodiment is shown in which the mast 48 does not include a positioning ridge 72. In this variation, the liner 52 is fastened to the mast 48, such as by a plurality of fasteners 74 which may be longitudinally aligned. The presence of the longitudinal gap 70 advantageously permits contraction and expansion of the liner 52, while the fastening of the liner 52 to the mast 48 advantageously prevents continuous rotation of the liner 52 within the mast 48. The fasteners 74 may be screws, bolts and nuts, rivets, or any other suitable fastener. While the fasteners 74 are shown adjacent the first longitudinal edge 66, in general the fasteners 74 may be applied anywhere around the circumference of the liner 52 cross-section.

Referring back to FIGS. 1, 2 and 5, a bottom end 76 of the mast 48 is centrally attached to the top of the skid 12 and a top end 78 of the mast 48 is centrally attached to the roof 80 of the container 14. In this manner, the longitudinal centerline 82 of the mast 48 is substantially aligned with the center of the skid 12 in the first embodiment. In variations of embodiments, the mast 48 may be attached to the skid 12 at any point thereof (e.g. proximate to one corner of the skid 12) and attached to the roof 80 at any point thereof (e.g. above a different corner of the skid 12), such that the mast 48 can extend at any suitable angle from the vertical. In practice, deviations of no more than 30 degrees from the vertical are preferable.

The main auger 46 is rotationally driven at its bottom end (proximate the bottom end 76 of the mast 48) by a lower motor 84 housed within the mast 48, and is rotationally driven at its top end (proximate the top end 78 of the mast 48) by an upper motor 86 that is also housed within the mast 48.

In the first embodiment, each of the lower motor 84 and the upper motor 86 is a hydraulic motor that is powered by an externally supplied hydraulic line (not shown). However, in general, any type of motor or engine, including an electric motor, pneumatic motor, mechanical power system, internal or external combustion engine or other source of motive power, may be employed.

Figure 12:
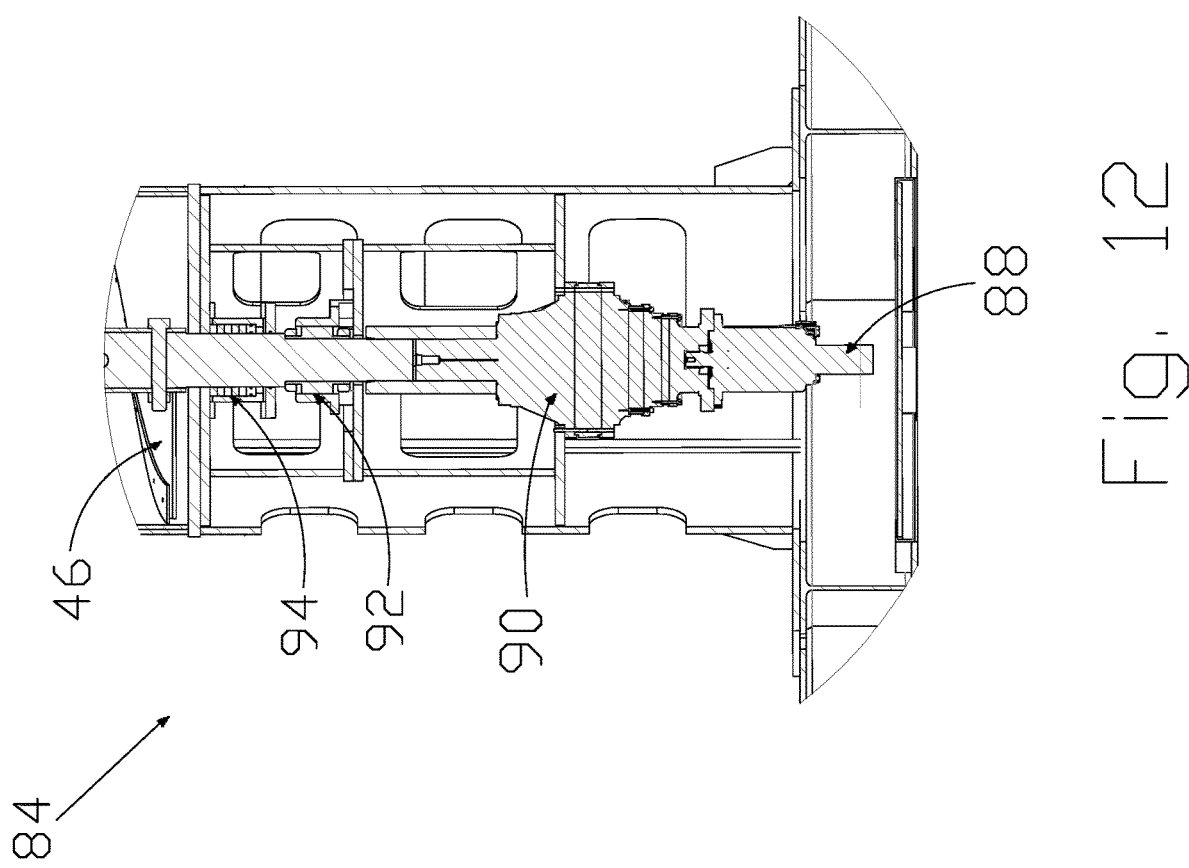
FIG. 12 is a sectional view of a portion of the silo shown in FIGS. 1 and 5, showing a lower motor.
Figure 13:
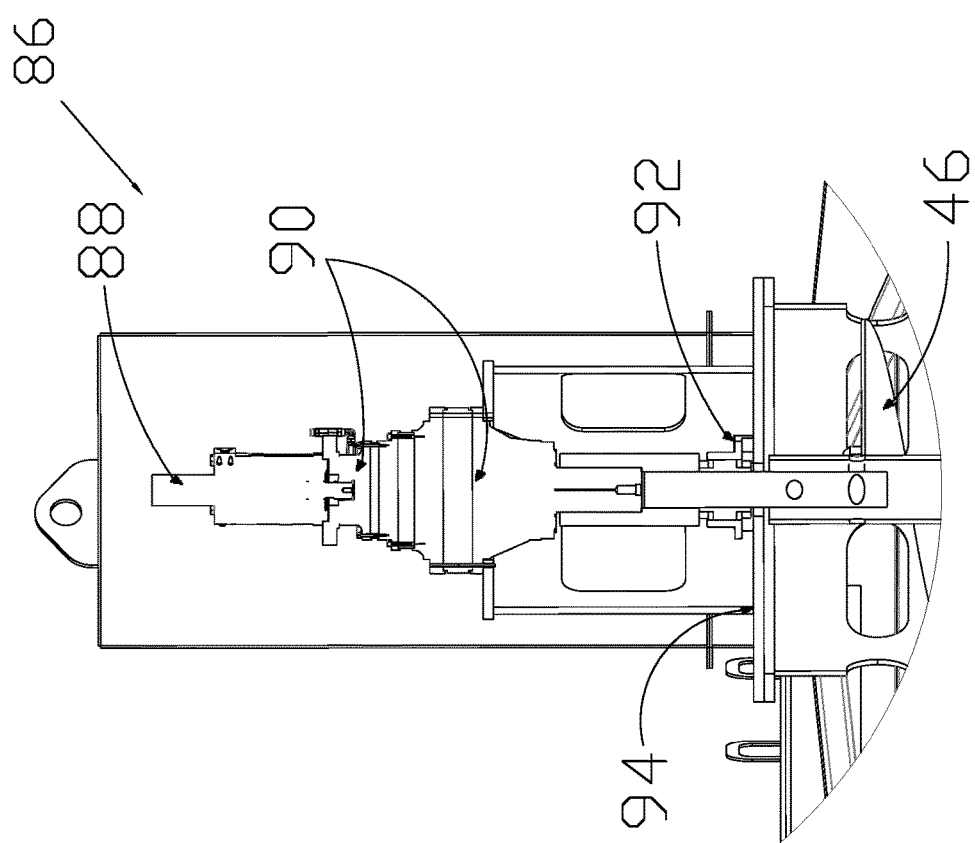
FIG. 13 is a sectional view of a portion of the silo shown in FIGS. 1 and 5, showing an upper motor.

Referring to FIG. 5, FIG. 12 (showing the lower motor 84) and FIG. 13 (showing the upper motor 86), each of the lower and upper motors 84 and 86 includes a hydraulic attachment point 88 for receiving an externally supplied hydraulic line (not shown), a gearbox 90 for producing a desired speed of rotation of the main auger 46, and a bearing 92 for rotatably attaching the motor 84 or 86 to the mast 48.

In the first embodiment, each of the lower and upper motors 84 and 86 is removably attachable to the mast 48, with a seal, such as the packing gland 94 shown in FIGS. 12 and 13, being disposed between the motor 84 or 86 and the mast 48 to prevent entry of the granular material into either motor 84 or 86. In the first embodiment, each of the lower and upper motors 84 and 86 is operable to drive the main auger 46, thereby advantageously permitting one of the lower and upper motors 84 and 86 to drive the main auger 46 in the event that the other of the lower and upper motors 84 and 86 fails, has been removed for maintenance or repair, or is otherwise non-operational. Ordinarily, when both the lower and upper motors 84 and 86 are operational, the silo 10 is operable in the first embodiment to coordinate and balance the respective driving forces applied by the lower and upper motors 84 and 86 so as to advantageously enhance the longevity and reliability of the silo 10. In the first embodiment, the silo 10 is operable to apply independently different or the same power levels to each of the lower and upper motors 84 and 86 so as to control (e.g. minimize) the torsional strain experienced by the main auger 46. For example, the applied power level may be greater where there is more granular material, such as initially when the granular material is being first received into the mast 48 proximate the lower motor 84, or where there is denser granular material at one end of the main auger 46 than the other end.

When the silo 10 is in its deployed configuration as shown in FIGS. 1, 2 and 5, granular material that enters the mast 48 via the feed auger 24 is captured by the main auger 46 for movement upward through the mast 48 to the top end 78 where the granular material is displaced through at least one outlet aperture of the mast 48, such as the top end 78 holes in the mast 48 shown in FIG. 5, into a main storage portion of the container 14. Granular material that enters the main storage portion of the container 14 typically falls under the force of gravity toward the bottom of the container 14.

While the container 14 in FIG. 1 has a single cylindrical side wall 96, in general any number of side walls 96 having any cross-sectional shape may be employed. The container 14 encompasses a storage space defined as being within the side wall(s) 96, above the bottom cone 26 and below the roof 80. The main storage portion of the container 14 is defined in the first embodiment as being within the storage space of the silo 10 but outside of the mast 48. Granular material being stored in the main storage portion of the container 14 is constrained by the bottom cone 26, mast 48, roof 80 and the side wall 96. The container 14 is supported by the frame 18, including in some embodiments the external pillars 98 (FIGS. 1 to 3), that is attached to the skid 12.

The main auger 46 and the mast 48 may have any suitable cross-sectional diameter, including having a cross-sectional diameter in the range of 12 inches (30 cm) to 60 inches (152 cm). The mast 48 in the first embodiment has a cross-sectional diameter of 36 inches (91 cm), for example. The mast 48 may have any suitable cross-sectional shape, including rectangular, square, polygonal, or the circular cross-sectional shape of the first embodiment.

The main auger 46 and the mast 48 may have any suitable length, including having a length in the range of 20 feet (6.1 m) to 70 feet (21.3 m). The main auger 46 in the first embodiment has a length of approximately 45 feet (13.7 m).

While the container 14 is shown in the Figures as having a cylindrical shape, in general any suitable shape and size may be employed. In the first embodiment, the shape and size of the container 14 is restricted comply with transport regulations. Other embodiments and variations are possible. In general, the container 14 may have any suitable cross-sectional shape, such as rectangular, square, polygonal, or the circular cross-sectional shape shown in the Figures.

In the first embodiment, the mast 48 is a structural member associated with the frame 18. In this manner, the mast 48 provides strength and rigidity to the silo 10 structure. In the first embodiment, the mast 48 serves as both a structural member and as a conduit for moving granular material into the container 14, thereby advantageously avoiding the need for external inclined augers, bucket elevators, pneumatic systems or other systems that have been used with conventional silos. In some embodiments, however, the mast 48 is not a structural member of the silo 10. In such embodiments, the mast 48 does not contribute to providing strength and rigidity to the silo 10 structure, and the frame 18 is appropriately dimensioned to provide such strength and rigidity.

Figure 14:
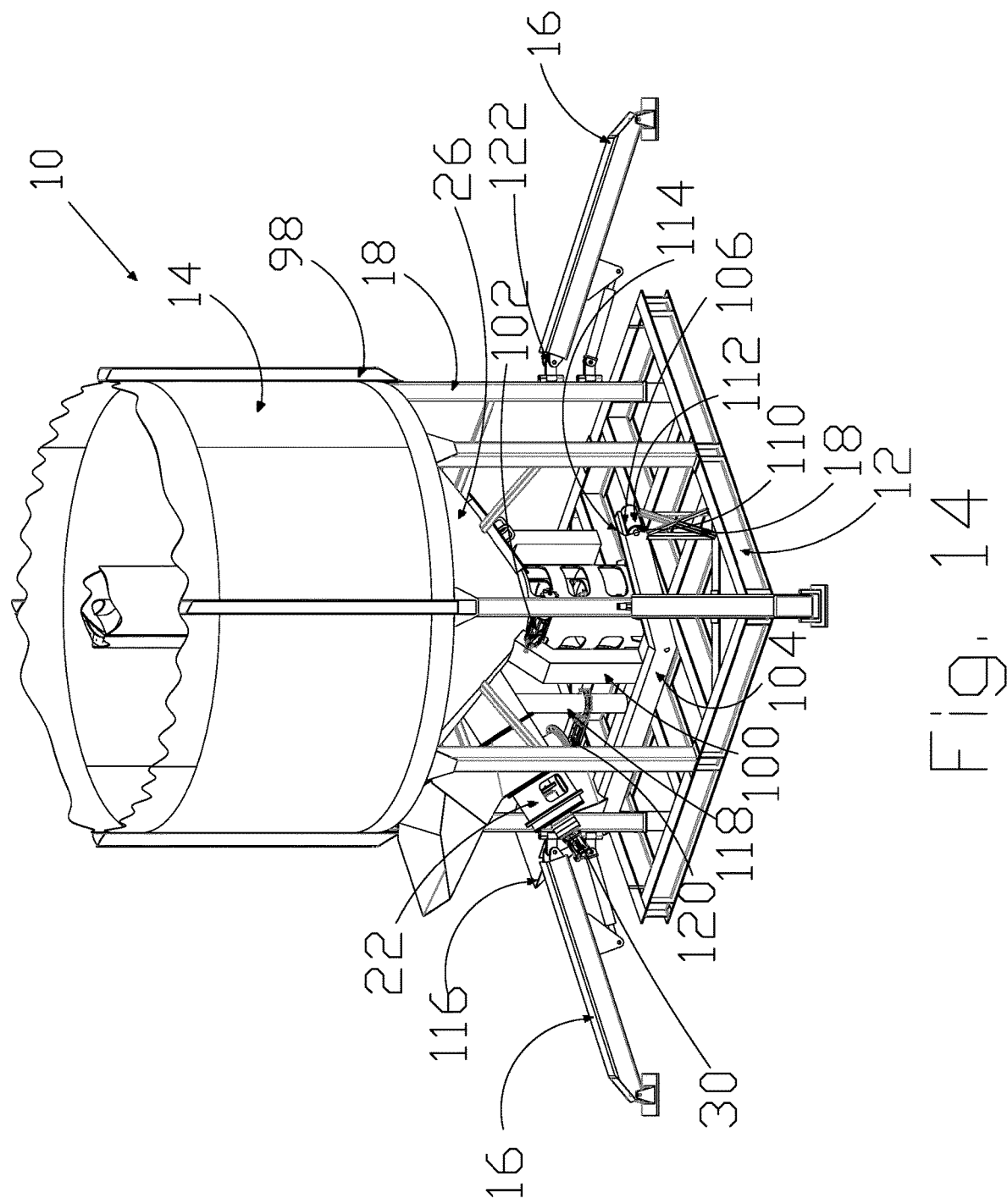
FIG. 14 is a perspective view of a portion of the silo shown in FIG. 1, showing a conveyor having a discharge port.
Figure 15:
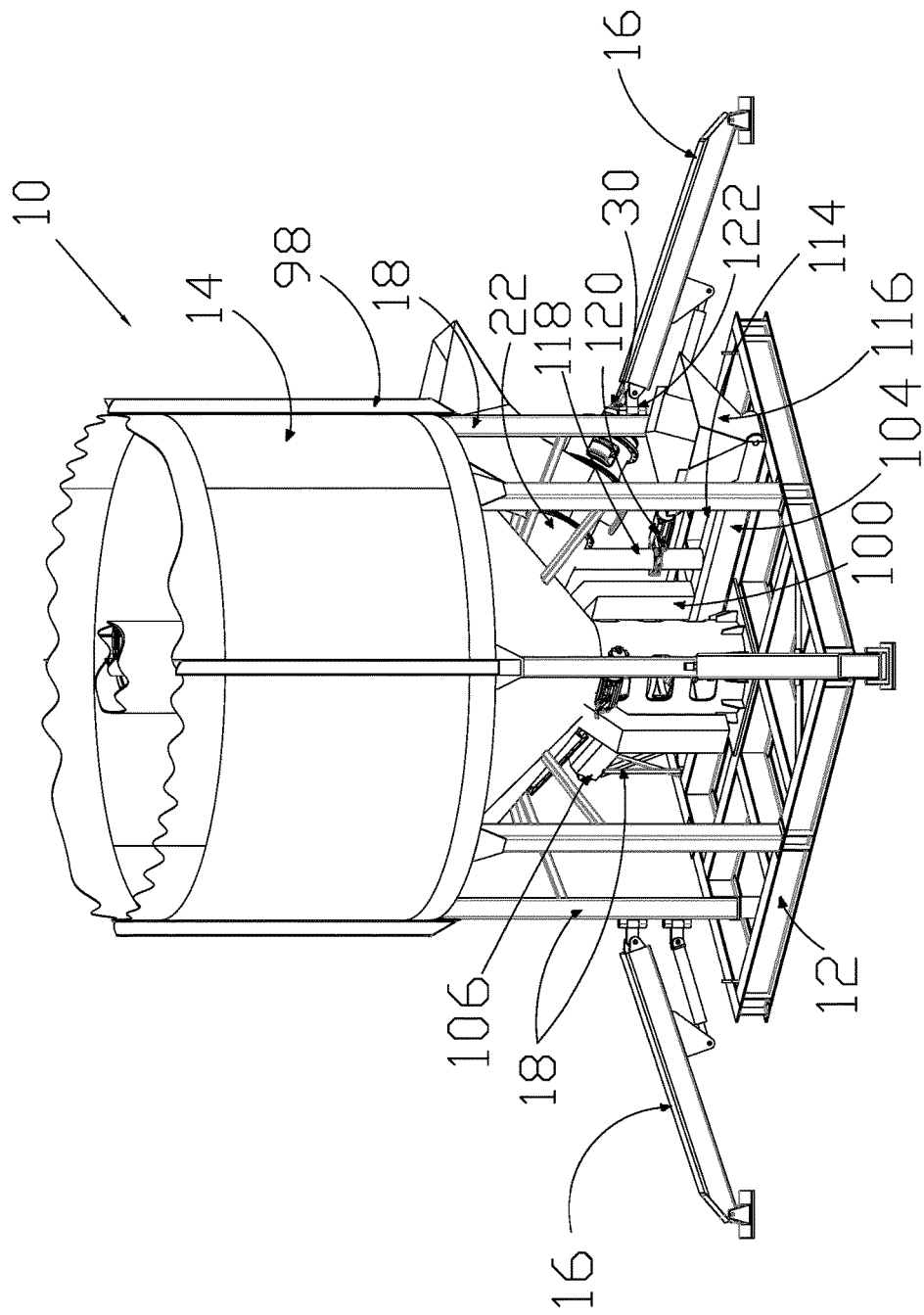
FIG. 15 is a perspective view of the portion shown in FIG. 14 rotated to a different view angle, showing a conveyor hopper.

Referring to FIGS. 14 and 15, the silo 10 is operable to discharge granular material from the container 14. The silo 10 includes an exit duct 100 projecting from an aperture in the bottom cone 26 of the container 14. An exit actuator 102 is operable to open and close an exit valve (not visible) of the exit duct 100 to permit or prevent granular material from entering into the exit duct 100 from the container 14. In the first embodiment, the silo 10 is operable to control the position of the exit valve between fully closed and fully opened so as to control the exit rate at which the granular material exits the container 14 via the exit duct 100. The exit actuator 102 may be of any suitable type, and may be powered by hydraulic pressure, electrical power, or other power sources for example. The exit valve may be of any suitable type, including a knife gate (not visible in the Figures) for example.

In the first embodiment, the exit duct 100 extends between the bottom cone 26 and a conveyor 104 of the silo 10. The conveyor 104 is attached to the top of the skid 12 and is operable to transport granular material that it receives from the exit duct 100 along the conveyor 104 to a discharge port 106 of the conveyor 104. Between the exit duct 100 and the discharge port 106, the conveyor 104 extends parallel to the skid 12 and then is inclined, or angled relative to the skid 12, toward the discharge port 106. At the discharge port 106, the conveyor 104 includes a head drum 110 about which a conveyor belt 112 rotates. In the first embodiment shown in FIGS. 14 and 15, the conveyor 104 includes a cover 114 that extends along the length of the conveyor 104 and is raised above the conveyor belt 112 so as to provide an enclosed conduit for the conveying of the granular material to the discharge port 106. In the first embodiment, the conveyor 104 at its discharge port 106 is located at one side of the skid 12 and is raised above the top of the skid 12 by the height of a frame 18 member supporting the discharge port 106. While such frame 18 member is shown in FIGS. 14 and 15 as having an X-shaped cross member, any suitable form of frame 18 member or other structural support may be employed. In some embodiments, the integral strength of the conveyor 104 is sufficient that the discharge port 106 distance from the skid 12 can be maintained without use of the frame 18 member shown in FIGS. 14 and 15.

Figure 4:
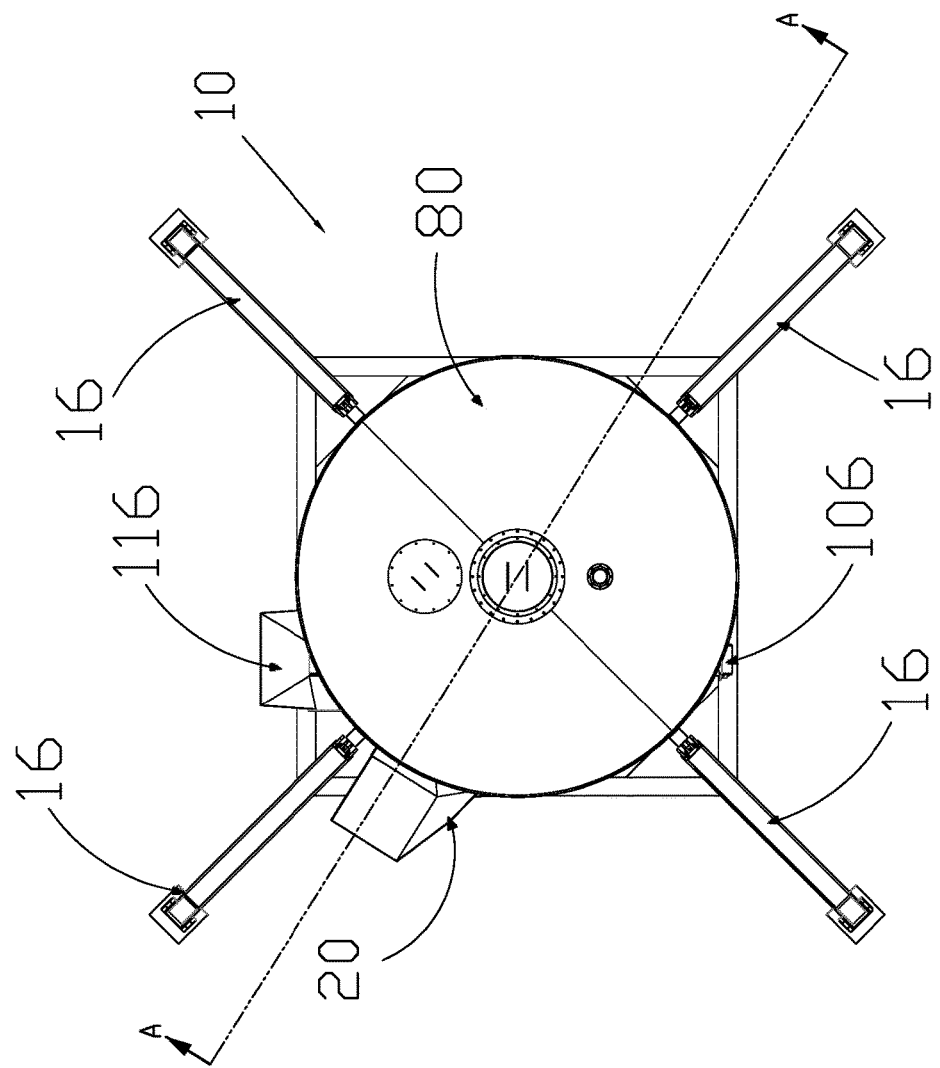
FIG. 4 is a top view of the silo shown in FIG. 1, showing the silo in its deployed configuration.

At the side of the skid 12 opposite the discharge port 106, the silo 10 in the first embodiment includes a receive port for receiving granular material, such as the conveyor hopper 116 of the conveyor 104 shown in FIGS. 4, 14, 15 and other Figures. In the first embodiment, the conveyor hopper 116 is pivotably attached to the cover 114 atop an aperture in the cover 114. In the deployed configuration, the conveyor hopper 116 projects upwardly from the cover 114 aperture so as to permit granular material that is received into the conveyor hopper 116 to drop onto the conveyor belt 112 being housed within the conveyor 104. In this manner, the silo 10 is operable to combine granular material received by the conveyor 104 at the conveyor hopper 116 and at the exit duct 100. In the first embodiment, the silo 10 is operable to control via the exit actuator 102 the exit rate of granular material through the exit duct 100 to achieve any desired exit rate so as to advantageously blend multiple streams of granular material in any desired blending ratio.

While the conveyor 104 in the first embodiment employs a conveyor belt 112, other conveying mechanisms may be suitably employed. In variations (not shown), the conveyor 104 may employ a screw-type conveyance mechanism, such as a conveying auger; a drag-type conveyance mechanism employing a trough and one or more paddles for pushing the granular material along the trough; a bucket-type conveyance mechanism employing buckets for carrying the granular material along a conveyance path; a pneumatic system having blowers and/or vacuum devices for pushing and/or pulling (i.e. sucking) the granular material along a conveyance path; other conveyance mechanisms, and any combination thereof for example.

Figure 16:
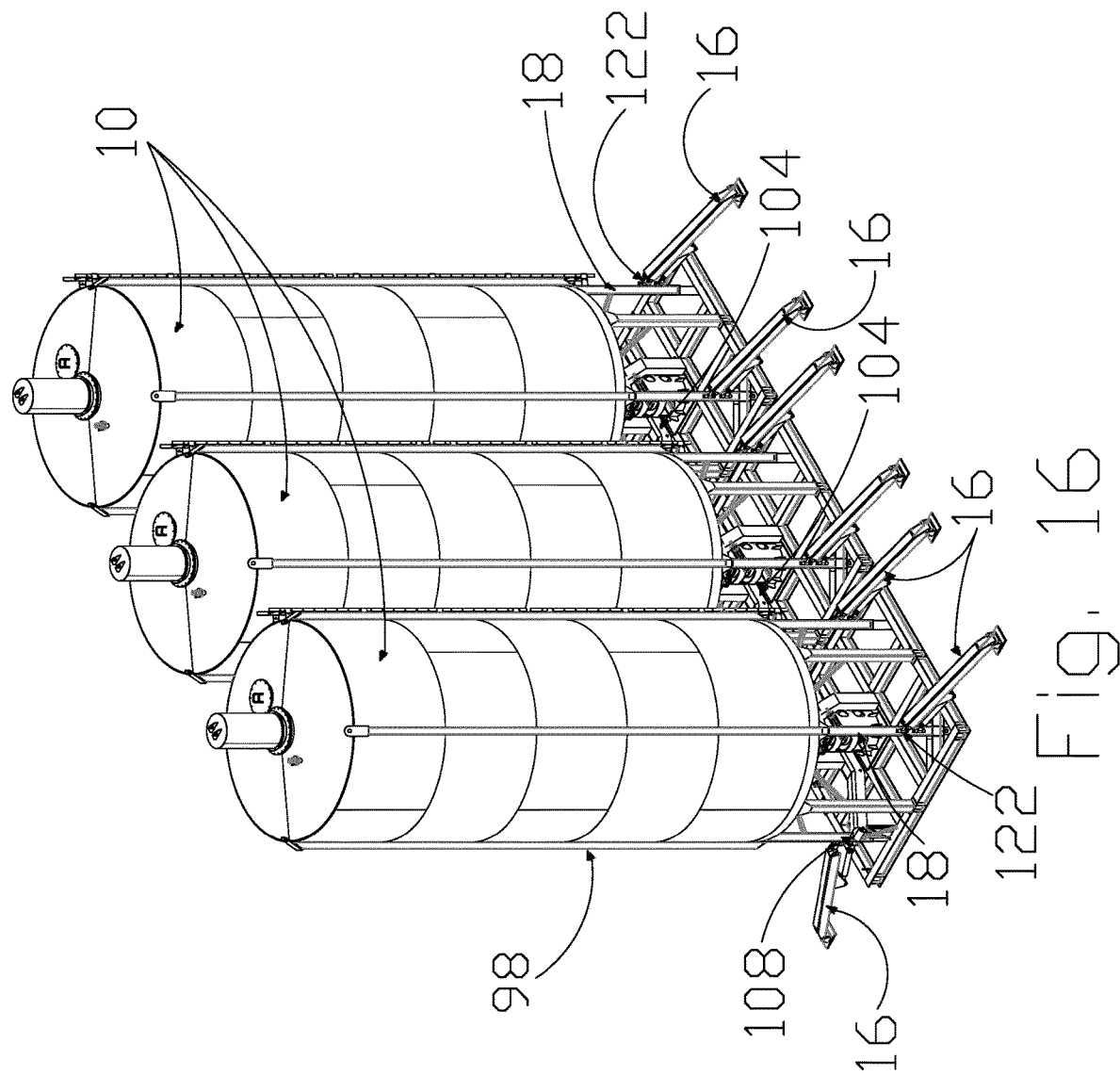
FIG. 16 is a perspective view of a plurality of silos shown in FIG. 1, showing the silos in their deployed configurations and cascaded with each other.
Figure 17:
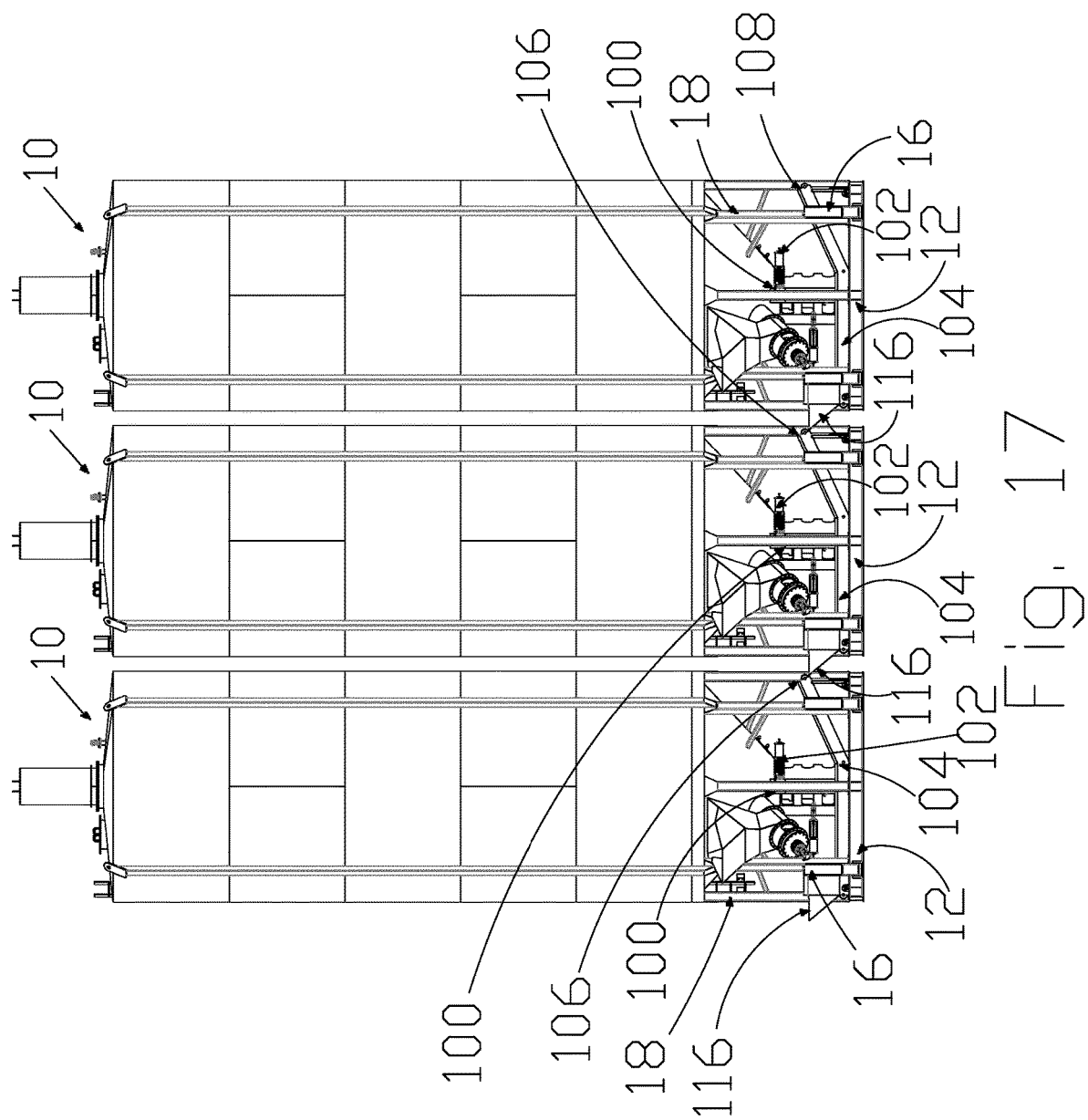
FIG. 17 is a side view of the plurality of deployed and cascaded silos shown in FIG. 16, showing respective heights of the discharge ports and the conveyor hoppers.

Referring to FIGS. 16 and 17, the silo 10 and its conveyor 104 is dimensioned in the first embodiment to facilitate cascading any number of silos 10 by having the height above the base of the discharge port 106 higher than the height above the base of the conveyor hopper 116, such that granular material that is discharged from the higher discharge port 106 of one silo 10 enters into the lower conveyor hopper 116 of a second, adjacently aligned silo 10. The granular material is then transported along the conveyor 104 of the second silo 10 to its discharge port 106. At the end of a number of cascaded silos 10 is a final discharge port 108 that delivers the granular material to an external destination. While FIGS. 16 and 17 show three silos 10 in cascading alignment, in general any number of silo 10 may be cascaded. Each cascaded silo 10 is operable to convey along the conveyor 104 granular material received by its conveyor hopper 116 and/or its exit duct 100 in any combination of flow rates. Thus, a plurality of cascaded silos 10 is advantageously operable to blend granular material from any selected silos 10 in any desired blending ratio.

While the conveyor hopper 116 and the discharge port 106 are on opposing sides of the skid 12 in the first embodiment, variations are possible. In some embodiments (not shown), the conveyor 104 in some embodiments includes a corner section such that the conveyor hopper 116 and the discharge port 106 are on different, but not opposing, sides of the skid 12. For example, a first silo 10 in a cascade may have a left-side discharge port 106, the second silo 10 in the cascade may have a right-side discharge port 106, a third silo 10 in the cascade may have an opposite-side discharge port 106 (as seen in FIGS. 16 and 17), and so on. Variations of positions of the discharge port 106 in relation to the conveyor hopper 116 advantageously permits a cascade of silos 10 to extend along any desirable path over terrain. In some embodiments (not shown), the discharge port 106 and/or other portions of the conveyor 104 may be replaceable and/or moveable components to allow for different positioning of the discharge port 106 relative to the conveyor hopper 116.

Referring to FIGS. 14 to 17, the outriggers 16 in the first embodiment are pivotably attached to the frame 18 so as to permit the outriggers 16 to extend away from the skid 12 at a desired angle within a range. For a solo silo 10 that is not cascaded, the outriggers 16 can be angled at approximately 45 degrees from the squared sides of the skid 12 so as to advantageously maximize stability of the solo silo 10, while cascaded silos 10 generally have their outriggers 16 extend at approximately 90 degrees to the squared sides of the skid 12 so as to advantageously avoid overlapping outriggers 16. In some applications, outriggers 16 disposed at the corners of a cascaded group of silos 10 can be directed at 45 degree angles extending outwardly from the corners of the cascaded group, for example.

Referring again to FIGS. 14 and 15, the silo 10 in the first embodiment includes a feed duct, such as the dump duct 118 projecting downwardly from an aperture in the feed-auger housing 22 and extending to the conveyor 104 at an aperture in the cover 114. The dump duct 118 includes a dump valve (not visible) actuated by a dump actuator 120 operable to open and close the dump valve. The dump actuator 120 may be of any suitable type, and may be powered by hydraulic pressure, electrical power, or other power sources for example. The dump valve may be of any suitable type, including being implemented by a knife gate (not visible in the Figures) for example.

The silo 10 in the first embodiment is operable to remove granular material from the feed-auger housing 22 and the mast 48, thereby advantageously permitting removal of granular material that has been received by the silo 10 but not (yet) moved into the container 14. The silo 10 is operable to rotationally drive in the reverse direction the feed auger 24, the main auger 46, or both the feed auger 24 and the main auger 46, thereby advantageously facilitating the removal of granular material via the dump duct 118. Emptying the feed-auger housing 22 and the mast 48 may be desirable, for example, if the power source to the silo 10 is lost mid-way through filling the container 14, or any other situation where filling is stopped, so as to minimize the load on the feed-auger motor 30 and the lower and upper motors 84 and 86 (FIG. 5) before restarting these motors 30, 84 and/or 86.

In the first embodiment, the silo 10 includes sensors, detectors and associated instrumentation for determining operational status of the silo 10 and its components. For example, the silo 10 in the first embodiment includes load pins 122 (FIGS. 14 and 15) that are operable to detect the load placed on each outrigger 16 at any given time. The load pins 122 may be implemented by strain gauges, for example. The silo 10 in the first embodiment is operable to monitor the load on each outrigger 16 and determine conditions of instability, such as when the ground shifts or strong winds are present, for example.

Furthermore, the silo 10 may include any one or more of the following additional sensing devices (not visible in the Figures): (a) level indicator for determining the level of granular material present in the container 14 at any given time; (b) flow rate detector for determining the flow rate of granular material within the feed-auger housing 22; (c) flow rate detector for determining the flow rate of granular material within the mast 48; (d) flow rate detectors for determining the flow rate of granular material flowing through the exit duct 100, the conveyor 104, and/or the discharge port 106 or 108; (e) valve position sensors for determining the position of each valve of the silo 10; (f) hydraulic pressure sensors for detecting the hydraulic power pressure applied to the motors 30, 84 and 86; (g) torque sensors for determining torque applied at the feed auger 24 and the main auger 46; (h) speed sensors for determining the rotational speed, typically in RPM (revolutions per minute), of the feed auger 24 and the main auger 46; (i) rotational encoder for determining the speed of operation of the conveyor 104; (j) other sensors; or any combination thereof for example.

Figure 18:
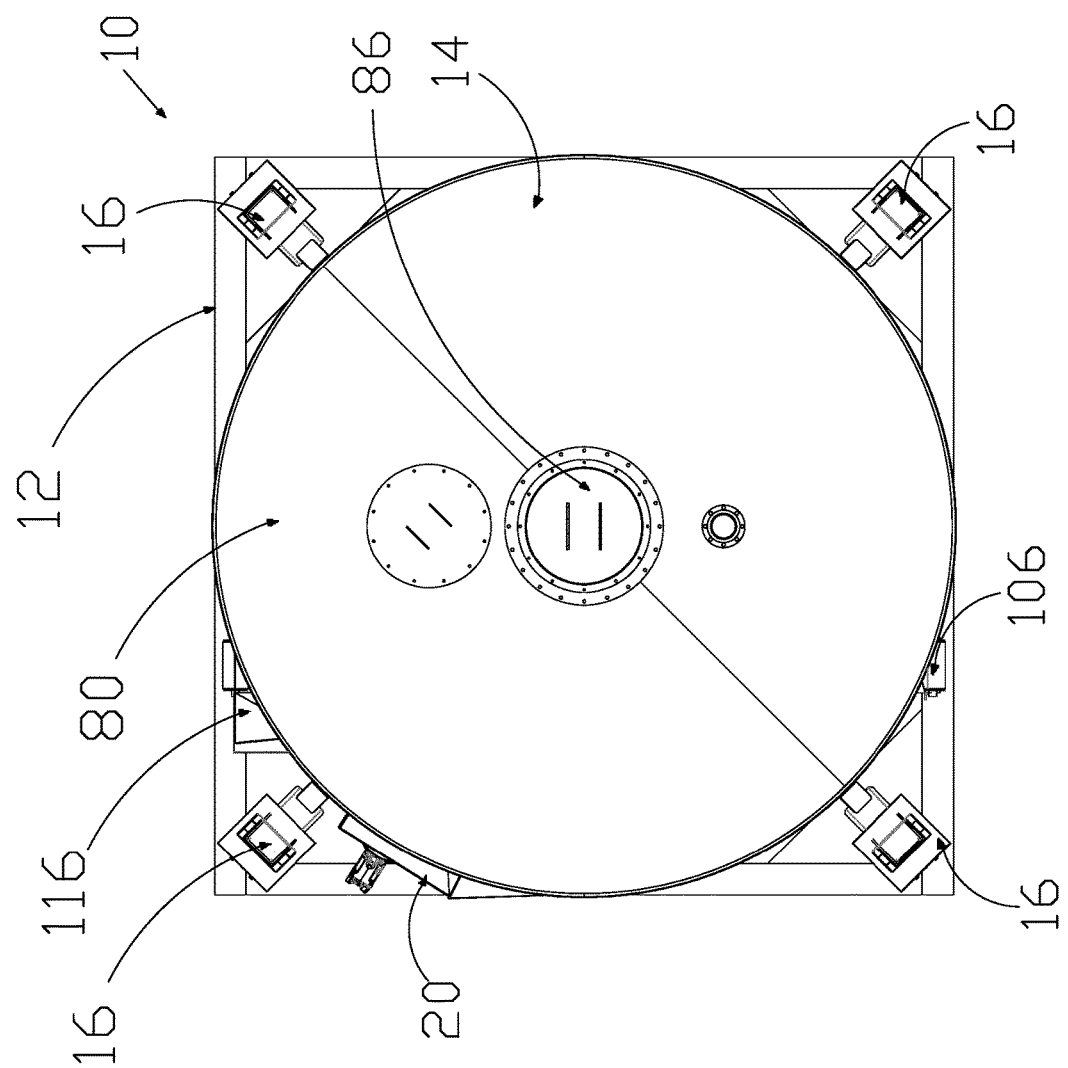
FIG. 18 is a top view of the silo shown in FIGS. 1 and 4, showing the silo in its transport configuration.

Referring back to FIGS. 3 and 4 and to FIG. 18, the transport configuration is achieved by retracting or pivoting inwardly the feed hopper 20, the conveyor hopper 116 and the outriggers 16 to respective retracted positions so that all silo 10 components become disposed within the envelope defined by the skid 12.

Figure 19:
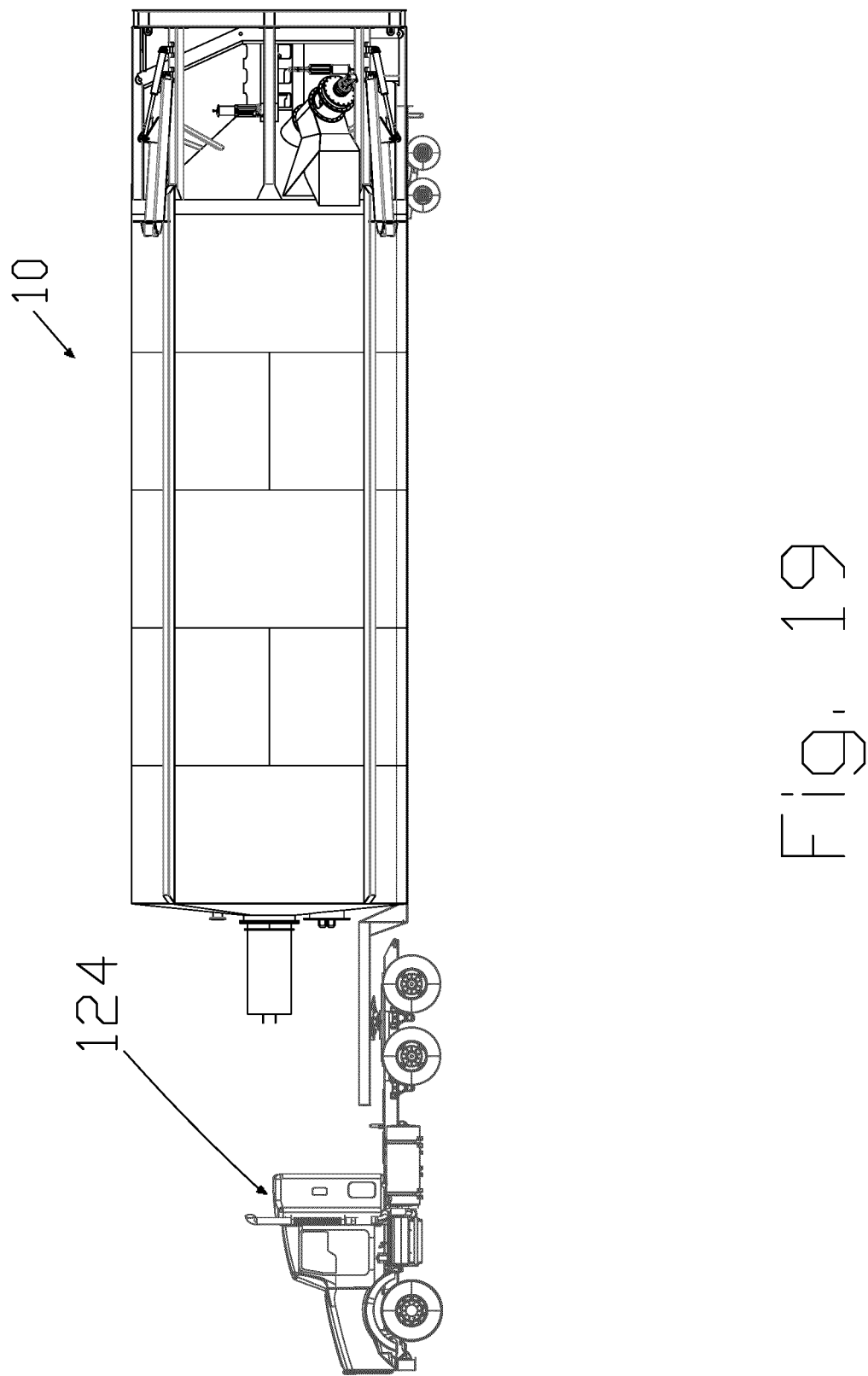
FIG. 19 is a side view of the silo shown in FIG. 18, showing the silo in its transport configuration being transported by a semi-trailer truck.

Referring to FIG. 19, the silo 10 in its transport configuration is suitable for transport by semi-trailer truck 124 as shown.

Second Embodiment

Referring to FIG. 20, the mobile and cascadable storage silo 10 according to a second embodiment of the invention includes an auger support such as the collar 126. The collar 126 is similar in dimensions and function to the mast 48 of the first embodiment (FIGS. 1 to 19), but does not extend all the way to the roof 80 of the silo 10 and is not a structural member associated with the frame 18. In general, the collar 126 can extend to any desirable height below the roof 80. In the second embodiment, the collar 126 extends above the inlet aperture 50, thereby advantageously preventing stored granular material from interfering with the receipt of further granular material by the main auger 46.

In the second embodiment, the frame 18 provides structural strength and rigidity to the silo 10 by any suitable means, such as by use of internal pillars 128 disposed inside the container 14. The internal pillars 128 may be employed in addition or alternatively to the external pillars 98 shown in FIGS. 1 to 3 and 14 to 16.

The feed hopper 20 and feed auger 24 (FIGS. 5, 7 and 20) of the first and second embodiments are similar or identical to each other.

Third Embodiment

Referring to FIGS. 21 and 22, the mobile and cascadable storage silo 10 according to a third embodiment of the invention includes a feed hopper 20 pivotably attached to a passive chute 130 that is acting as a feed conduit between the feed hopper 20 and the main auger 46. The passive chute 130 does not house a feed auger, and is angled such that the feed hopper 20 is higher than the inlet aperture 50 of the collar 126. Preferably, the passive chute 130 is angled at a sufficiently steep angle to cause granular material that is fed into the feed hopper 20 to drop by gravity alone into the collar 126 via the inlet aperture 50. The minimum angle of the passive chute 130 will vary according to the type of granular material. In the third embodiment, the angle of the passive chute 130 relative to the skid 12 is approximately 45 degrees, thereby advantageously ensuring sufficient steepness for a variety of granular material types.

The feed hopper 20 of the third embodiment is also pivotable to extend outward beyond the transport envelope defined by the skid 12 to an operating position, as shown in FIG. 21, and retractable to a retracted position within the transport envelope, as shown in FIG. 22. In the third embodiment, the container 14 includes a recess 132 to accommodate the steeply angled passive chute 130. In some embodiments (not shown), the passive chute 130 at its lower end does not extend inwardly as far the inlet aperture 50 and another conveyor, such as a belt conveyor (not shown) for example, may be suitably employed to move granular material horizontally or at a less steep downward slope from the bottom of the passive chute 130 to, and possibly into, the mast 48 (FIGS. 5 and 8) or collar 126 via the inlet aperture 50. In such embodiments, the recess 132 may not be needed.

While the passive chute 130 is shown in FIGS. 21 and 22 as being used in conjunction with the collar 126, either the mast 48 or the collar 126 in any embodiment may be suitably employed with or without a feed auger 24 (FIGS. 5 and 7) and in conjunction with any suitable feed mechanism.

In variations of the third embodiment, the collar 126 may extend to any height above the inlet aperture 50 and below the roof 80. By way of example, the collar 126 shown in FIG. 21 extends to a height that is commensurate with the top of the bottom cone 26. By way of further example, the collar 126 shown in FIG. 22 extends to a height that is approximately mid-way up the container 14. Other variations are possible.

Referring to FIGS. 20, 21 and 22, variations of the frame 18 may include the internal pillars 128 either distal from the main auger 46, as shown in FIG. 20; proximate the main auger 46, as shown in FIG. 21; or without internal pillars 128, as shown in FIG. 22. The silo 10 may also include the external pillars 98 outside of the container 14, as shown in FIGS. 1 to 3 and 14 to 16 for example, in conjunction with or in place of any of the internal pillars 128. As a further variation shown in FIG. 22, beams 134 extend from the top of the collar 126 to the side wall 80. In this variation, a plurality of transverse beams 134 and a plurality of angled beams 134 radially extend between the collar 126 and the side wall 80. In general, any number of the beams 134 attached at any height along the collar 126 may be employed, in conjunction with or in place of the external pillars 98 and/or the internal pillars 128.

Fourth Embodiment

FIGS. 23 and 24 show an auger duct 136 that advantageously permits granular material to exit the mast 48 proximate its lower end via a duct aperture 138 in the mast 48. An auger-duct actuator 140 is operable to open and close an auger-duct valve (not visible) of the auger duct 136 to permit or prevent granular material from entering into the auger duct 136 from the mast 48. The granular material that exits the auger duct 136 can be captured by any suitable container or vessel (not shown) or conveyor, including the conveyor 104 (FIGS. 14 to 17) for example.

The auger duct 136 is compatible for use with any of the embodiments of the invention, and may be suitably used in conjunction with the collar 126 (FIGS. 20 to 22) in place of the mast 48 for example. The auger duct 136 is particularly suitable for use in embodiments having a passive chute (FIGS. 21 and 22), or otherwise not having a feed auger 24 and a dump duct 118, such that the mast 48 (or collar 126) and the passive chute 130 (if present) can be emptied without reversing the main auger 46 (FIG. 5) or by reversing only the main auger 46. Also, the auger duct 136 may be employed in conjunction with or in place of either the feed auger 24 or the exit duct 100 (FIGS. 14 to 17), or in conjunction with or in place of both the feed auger 24 and the exit duct 100.

In embodiments having the auger duct 136, the silo 10 is operable to control the position of the auger-duct valve between fully closed and fully opened so as to control the exit rate at which the granular material exits the container 14 via the auger duct 136. The auger-duct actuator 140 may be of any suitable type, and may be powered by hydraulic pressure, electrical power, or other power sources for example. The auger-duct valve may be of any suitable type, including a knife gate (not visible in the Figures) for example.

The sensing devices described herein above in respect of the first embodiment may be suitably applied, with appropriate changes as may be necessary, to any one or more of the second, third, fourth or other embodiments.

Thus, there is provided a mobile and cascadable storage silo comprising: (a) a container for storing granular material; (b) a base for supporting the container on top of the base, the base being dimensioned for transport; (c) a conveyor for conveying the granular material, the conveyor being attached to the top of the base, the conveyor comprising: (i) a conveyor hopper for receiving additional granular material on a first side of the base, the conveyor hopper being distal from the top of the base by a first distance, and (ii) a discharge port for discharging the additional granular material on a second side of the base opposite the first side, the discharge port being distal from the top of the base by a second distance greater than the first distance so as to permit the additional granular material to be discharged from the discharge port into a second conveyor hopper of a second silo adjacently aligned with the mobile and cascadable storage silo; and (d) an exit duct extending between the container and the conveyor for permitting the granular material to exit the container and be received by the conveyor for blending with the additional granular material prior to being discharged from the discharge port.

Method of Operation

The silo 10 shown in the Figures is typically transported by truck in its transport configuration (FIGS. 3, 18 and 19) oriented horizontally on a suitable truck trailer. On site, the silo 10 is transitioned to a vertical orientation in which the skid 12 rests on the ground and supports the container 14 atop the skid 12 (FIGS. 1 to 2, and/or 16 to 17). External hydraulic and electrical power is connected at appropriate connection points of the silo 10.

In the first and other embodiments, the silo 10 includes a processor (not visible in the Figures) for performing computations and a memory circuit (not visible in the Figures) for storing data, such as measurement data, and program code for directing operations of the processor. The processor is typically a PLC (programmable logic controller), but in variations can be any suitable processing circuit. The memory circuit may include any suitable type of storage device(s) capable of implementing volatile memory such as RAM (random-access memory), non-volatile memory such as ROM (read-only memory) and variations thereof, other types of memory, or any combination thereof for example.

When electrical power is being supplied to the processor and the memory circuit, the processor is directed to begin executing the instructions stored in the memory circuit. Under the control of the processor, an initialization routine is performed to determine the operational status of variations aspects of the silo 10, including charging the hydraulic system as appropriate for operability. Under the control of the processor, manually, or by a combination of processor-controlled operations and manual operation(s), the feed hopper 20, the conveyor hopper 116 and the outriggers 16 are extended into their operating positions. In this manner, the silo 10 is converted from its transport configuration (FIGS. 3, 4 and 18) to its deployed configuration (FIGS. 1 to 2 and 16 to 17). If cascading is desired, the silo 10 can be transitioned to its vertical orientation at a location for cascading alignment with another silo 10 or other silos 10.

Once deployed, the silo 10 can receive granular material via its feed hopper 20 for feeding into the container 14 via the feed auger 24 and the main auger 46. In the first and other embodiments, the processor is operable to receive user input directing the processor to cause the lower and upper motors 84 and 86 to rotationally drive the main auger 46. The processor is operable to determine the extent of power, such as hydraulic power, to be supplied to each of the lower and upper motors 84 and 86 in response to the user input. Furthermore, the processor is operable to receive data indicative of the rate of flow of the granular material within the feed-auger housing 22 and within the mast 48, torque applied at the main auger 46, hydraulic power pressure applied to each of the lower and upper motors 84 and 86, rotational speed (e.g. in RPM) of the main auger 46 at various points along the length of the main auger 46. In the first and other embodiments, the processor is operable to determine and adjust in real-time the hydraulic power pressure applied to each of the lower and upper motors 84 and 86 in response to user input and the received data so as to minimize twisting torque along the main auger 46, thereby advantageously balancing the rotational forces along the main auger 46. Doing so advantageously enhances longevity and reliability of the main auger 46.

Material present in the container 14 can be discharged via the exit duct 100 and the conveyor 104. The processor is operable to receive user input indicating a desired exit rate, determine an exit-valve position associated with the desired exit rate, and output a control signal to the exit actuator 102 to achieve the desired exit rate. In some embodiments, the processor is also operable to receive sensor data indicating the actual exit rate and/or data indicating the actual exit-valve position, and adjust its determination of the exit-valve position accordingly.

During operation, the processor (not visible in the Figures) is operable to detect various alarm conditions. For example, in some embodiments the processor is operable to determine conditions of instability on the basis of readings from the load pins 122 in conjunction with an indication of the level of granular material present in the container 14. In some embodiments, the processor is operable to determine conditions of improper material flow on the basis of real-time comparisons between the rate of material flow entering the silo 10, the rate of material flow exiting the silo 10, and the indication of the level of material present in the container 14. Other processing to determine alarm conditions are possible.

The silo 10 is operable to produce a variety of user output in response to an alarm condition, such as visual indicators (e.g. flashing light), audible indicators (e.g. alarm horn), visual readouts and/or message(s) on a display of the silo 10, transmission of alarm messages to a remote location. Additionally or alternatively, the silo 10 in some embodiments is operable to shut down specific components of the silo 10, including possibly a complete shut down of all silo 10 components, in response to certain alarm conditions. The alarm conditions that result in a shut-down may be user selectable, for example.

A plurality of cascaded silo 10 according to the first and other embodiments is operable to produce a blend of granular material discharged from selectable cascaded silos 10 in desired blend ratios. The processor of each silo 10, or a master processor (not shown), is directed to receive as user input the bulk density (e.g. in pounds per cubic foot or kilograms per cubic metre) of the granular material being stored in the container 14 of each silo 10. For example, different silos 10 within a group of cascaded silos 10 can be filled with granular material having different bulk densities, and an operator can input the specific bulk density associated with the particular material contained by each non-empty silo 10 in the group.

Furthermore, the processor of each silo 10, of any given silo 10, or a master processor (not shown), is directed to receive as user input a desired discharge flow rate (e.g. in metric tons per hour). Additionally, at least one processor is directed to receive as user input a desired density of discharged material and/or blend ratio for selected silos 10 in a given cascade of silos 10. For example, an operator may input that 30% of the discharge should be from a first identified silo 10, while 45% of the discharge should be from a second identified silo 10, and the remaining 25% of the discharge should be from a third identified silo 10.

Thereafter, at least one processor is operable to determine in response to the user input of respective bulk densities, the desired discharge flow rate and the blend ratio or equivalent, such as by use of a look-up table stored in the associated memory circuit, the appropriate valve positions for the exit ducts 100 of the selected silos 10 that will result in the desirably blended granular material at the final discharge port 108 of the group of cascaded silos 10.

In the first and other embodiments, the respective processors of a plurality of cascaded silos 10 are operable to communicate with each other, such that user input can be received at any one of the respective processors to control the operation of the entire cascaded group.

When the silo 10 is emptied of granular material, the processor in at least some embodiments is directed to respond to appropriate user input by retracting one or more of the feed hopper 20, conveyor hopper 116 and the outriggers 16 so that all silo 10 components become disposed within the envelope defined by the skid 12. Additionally or alternatively, one or more of the feed hopper 20, conveyor hopper 116 and the outriggers 16 may be retracted manually. When the silo 10 is in its transport configuration, the external hydraulic and electrical power is disconnected. Thereafter, the silo 10 may be transported in its transport configuration, such as being transported by the semi-trailer truck 124 shown in FIG. 19.

Thus, there is provided a method of blending granular material stored in a plurality of storage silos, the method comprising: (a) receiving, as user input by at least one processor having an associated memory, a density associated with the granular material stored in each silo of the plurality of storage silos when the plurality of storage silos are cascaded such that granular material discharged from a discharge port of a conveyor of said each silo other than a final silo of said plurality of storage silos is received by an adjacent conveyor of an adjacently aligned said each silo, said conveyor being operable to transport granular material from one side of said each silo to another side of said each silo opposite said one side; (b) receiving, as user input by said at least one processor, a desired blend of granular material to be discharged by said plurality of storage silos; (c) receiving, as user input by said at least one processor, a desired output flow rate for the granular material to be discharged by said plurality of storage silos; (d) determining, by the at least one processor, the valve position associated with each valve of said each silo operable to cause a discharge of granular material from said each silo; and (e) causing, by the at least one processor, said each valve to be set to each associated said valve position.

While embodiments of the invention have been described and illustrated, such embodiments should be considered illustrative of the invention only. The invention may include variants not described or illustrated herein in detail. Thus, the embodiments described and illustrated herein should not be considered to limit the invention as construed in accordance with the accompanying claims.

What is claimed is:

1. A storage silo for storing granular material, the storage silo having a container supported by a base, the container having a roof and at least one side wall for defining a storage space beneath the roof, the storage silo comprising:
    (a) a feed port for receiving the granular material at a feed-port height lower than the roof;
    (b) an auger for moving the granular material toward the roof within the storage space, said auger receiving the granular material via said feed port; and
    (c) first and second auger motors for cooperatively driving said auger, said first and second auger motors being disposed at opposing ends of said auger.

2. The storage silo of claim 1 further comprising a processor operable to determine, in response to sensor data received by said processor, power levels respectively associated with said first and second auger motors so as to minimize torsional strain on said auger.

3. The storage silo of claim 2 further comprising an auger support for supporting said auger, said auger support comprising an inlet aperture through which the granular material is received by said auger from said feed port.

4. The storage silo of claim 3 further comprising an auger duct operable to permit granular material to exit said auger support.

5. The storage silo of claim 3 wherein said auger support extends between the base and the roof, said auger support comprising an outlet aperture proximate the roof through which the granular material exits said auger support.

6. The storage silo of claim 3 wherein said auger support comprises an inner liner made of a low-friction material, said auger having a helical outer edge and comprising an edging for lining at least said helical outer edge, said edging being made of a low-friction material, contact between said helical outer edge and said auger support occurring only between said edging and said inner liner.

7. The storage silo of claim 6 wherein said auger support comprises a positioning ridge dimensioned to prevent continuous rotation of said inner liner.

8. The storage silo of claim 6 wherein at least one of said auger support and said edging comprises helically elongated fastening slots.

9. The storage silo of claim 3 further comprising a feed conduit extending between said feed port and said auger support, and further comprising a feed auger housed within said feed conduit, said feed auger having a discharge end proximate said auger, said feed auger being unattached at its discharge end.

10. The storage silo of claim 9 wherein said feed conduit comprises a conduit liner made of a low-friction material, said feed auger having a helical outer feed edge and comprising a feed edging for lining at least said helical outer feed edge, said feed edging being made of a low-friction material, contact between said helical outer feed edge and said feed conduit occurring only between said feed edging and said conduit liner.

11. The storage silo of claim 9 further comprising a dump duct attached to said feed conduit, said auger and said feed auger being reversible so as to permit granular material disposed in at least one of said feed conduit and said auger support to exit said feed conduit via said dump duct.

12. The storage silo of claim 2 wherein the base is dimensioned to define an envelope suitable for transport, the storage silo further comprising a receive port for receiving additional granular material and further comprising one or more outriggers attached to the base, and wherein each of said feed port, said receive port, and said one or more outriggers is operable to pivotably extend beyond the envelope and to pivotably retract to a respective position within the envelope.

13. The storage silo of claim 12 further comprising one or more load pins operable to sense loads placed on said one or more outriggers, respectively, said processor being operable to determine an indication of stability of the storage silo in response to sensor data received by said processor from said one or more load pins.

14. The storage silo of claim 12 wherein said receive port is operable to receive the additional granular material at a first height lower than the roof, the storage silo further comprising an exit duct to permit the granular material to exit the container and further comprising a discharge port for discharging the granular material and the additional granular material at a second height lower than the roof and higher than the first height so as to permit material to be discharged from said discharge port into a second receive port of a second said storage silo positioned for cascading with the storage silo.

15. A storage silo for storing granular material, the storage silo having a container supported by a base, the container having a roof and at least one side wall for defining a storage space beneath the roof, the storage silo comprising:
    (a) an exit duct to permit the granular material to exit the container;
    (b) a receive port for receiving additional granular material at a first height lower than the roof; and
    (c) a discharge port for discharging the granular material and the additional granular material at a second height lower than the roof and higher than the first height so as to permit material to be discharged from said discharge port into a second receive port of a second said storage silo positioned for cascading with the storage silo.

16. The storage silo of claim 15 further comprising a processor operable to control said exit duct in response to user input received by said processor such that the granular material exits the container via the exit duct at a desired exit rate.

17. The storage silo of claim 16 further comprising a conveyor for receiving the granular material from said exit duct, receiving the additional granular material from said receive port, and conveying the granular material and the additional granular material to said discharge port.

18. The storage silo of claim 16 wherein said receive port and said discharge port are on opposing sides of the base.

19. The storage silo of claim 16 further comprising a feed port for receiving the granular material at a feed-port height lower than the roof, an auger for moving the granular material toward the roof within the storage space, said auger receiving the granular material via said feed port, and further comprising first and second auger motors for cooperatively driving said auger, said first and second auger motors being disposed at opposing ends of said auger.

20. The storage silo of claim 19 wherein said processor is operable to determine, in response to sensor data received by said processor, power levels respectively associated with said first and second auger motors so as to minimize torsional strain on said auger.

21. The storage silo of claim 20 further comprising an auger support for supporting said auger, said auger support comprising an inlet aperture through which the granular material is received by said auger from said feed port.

22. The storage silo of claim 21 further comprising an auger duct operable to permit granular material to exit said auger support.

23. The storage silo of claim 21 wherein said auger support extends between the base and the roof, said auger support comprising an outlet aperture proximate the roof through which the granular material exits the auger support.

24. The storage silo of claim 21 wherein said auger support comprises an inner liner made of a low-friction material, said auger having a helical outer edge and comprising an edging for lining at least said helical outer edge, said edging being made of a low-friction material, contact between said helical outer edge and said auger support occurring only between said edging and said inner liner.

25. The storage silo of claim 24 wherein said auger support comprises a positioning ridge dimensioned to prevent continuous rotation of said inner liner.

26. The storage silo of claim 24 wherein at least one of said auger support and said edging comprises helically elongated fastening slots.

27. The storage silo of claim 21 further comprising a feed conduit extending between said feed port and said auger support, and further comprising a feed auger housed within said feed conduit, said feed auger having a discharge end proximate said auger, said feed auger being unattached at its discharge end.

28. The storage silo of claim 27 wherein said feed conduit comprises a conduit liner made of a low-friction material, said feed auger having a helical outer feed edge and comprising a feed edging for lining at least said helical outer feed edge, said feed edging being made of a low-friction material, contact between said helical outer feed edge and said feed conduit occurring only between said feed edging and said conduit liner.

29. The storage silo of claim 27 further comprising a dump duct attached to said feed conduit, said auger and said feed auger being reversible so as to permit granular material disposed in at least one of said feed conduit and said auger support to exit said feed conduit via said dump duct.

30. The storage silo of claim 19 wherein the base is dimensioned to define an envelope suitable for transport, the storage silo further comprising one or more outriggers attached to the base, and wherein each of said feed port, said receive port, and said one or more outriggers is operable to pivotably extend beyond the envelope and to pivotably retract to a respective position within the envelope.

31. The storage silo of claim 30 further comprising one or more load pins operable to sense loads placed on said one or more outriggers, respectively, said processor being operable to determine an indication of stability of the storage silo in response to sensor data received by said processor from said one or more load pins.

* * * * *